United States Patent
Boren et al.

(10) Patent No.: US 9,783,300 B2
(45) Date of Patent: Oct. 10, 2017

(54) AIRCRAFT SEATING SYSTEMS

(71) Applicant: The Boeing Company, Chicago, IL (US)

(72) Inventors: Kelly L. Boren, Queen Creek, AZ (US); Mithra M. K. V. Sankrithi, Lake Forest Park, WA (US); Rush F. Green, Seattle, WA (US); Gregory J. Oakes, Snohomish, WA (US); Sergey Barmichev, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 404 days.

(21) Appl. No.: 14/446,207

(22) Filed: Jul. 29, 2014

(65) Prior Publication Data

US 2014/0337067 A1    Nov. 13, 2014

Related U.S. Application Data

(62) Division of application No. 13/246,579, filed on Sep. 27, 2011, now Pat. No. 8,870,116.

(51) Int. Cl.
*B64D 11/00* (2006.01)
*B64D 11/06* (2006.01)
*G06Q 10/02* (2012.01)
*G06Q 50/30* (2012.01)

(52) U.S. Cl.
CPC ............ *B64D 11/00* (2013.01); *B64D 11/06* (2013.01); *B64D 11/0601* (2014.12); *B64D 11/0693* (2013.01); *B64D 11/0696* (2013.01); *G06Q 10/02* (2013.01); *G06Q 50/30* (2013.01)

(58) Field of Classification Search
USPC ............................................ 244/118.6, 118.5
See application file for complete search history.

(56) References Cited

U.S. PATENT DOCUMENTS

| | | | |
|---|---|---|---|
| 4,533,175 A | 8/1985 | Brennan | |
| 6,000,659 A | 12/1999 | Brauer | |
| 6,834,833 B2 | 12/2004 | Sankrithi | |
| 6,913,227 B1 | 7/2005 | Mahmulyin | |
| 7,578,551 B2 | 8/2009 | Linero | |
| 7,703,718 B2 | 4/2010 | Saint-Jalmes et al. | |
| 7,716,797 B2 | 5/2010 | Kismarton et al. | |
| 7,717,372 B2 | 5/2010 | Sankrithi et al. | |
| 7,954,762 B2 | 6/2011 | Boren et al. | |
| 8,393,680 B2 | 3/2013 | Zimmermann et al. | |
| 2008/0315036 A1 | 12/2008 | Wilcynski | |

(Continued)

FOREIGN PATENT DOCUMENTS

JP    H0610037 U    2/1994

OTHER PUBLICATIONS

Comfort House, Global 2450 Salute Manager Chair, obtained from http://www.comforthouse.com/oversizedchair.html retrieved on Jul. 6, 2011 (2 pages).

(Continued)

*Primary Examiner* — Christopher P Ellis
(74) *Attorney, Agent, or Firm* — Yee & Associates, P.C.

(57) ABSTRACT

A method and apparatus comprising a plurality of seating systems and a frame for use in a passenger aircraft. A first seating system in the plurality of seating systems may have different dimensions from a second seating system in the plurality of seating systems. A frame may be configured to be connected to the plurality of seating systems.

13 Claims, 20 Drawing Sheets

(56) References Cited

U.S. PATENT DOCUMENTS

| | | |
|---|---|---|
| 2009/0321565 A1 | 12/2009 | Barmichev et al. |
| 2010/0090510 A1 | 4/2010 | Kyogoku et al. |
| 2010/0109400 A1 | 5/2010 | Kneller et al. |
| 2013/0080357 A1 | 3/2013 | Boren et al. |
| 2013/0256456 A1 | 10/2013 | Malek et al. |

OTHER PUBLICATIONS

Ostrower, "Bombardier to offer wider middle seat for CSeries", Air Transport Intelligence News, Feb. 11, 2009, 3 pages.

"Quick look: Bombardier CS-100/300," http://cponline.thecanadianpress.com/graphics/2013/static/cp-bombardier-c-series.jpg, accessed Feb. 20, 2014, 2 pages.

Office Action, dated Dec. 17, 2013, regarding U.S. Appl. No. 13/246,579, 9 pages.

Final Office Action, dated Feb. 14, 2014, regarding U.S. Appl. No. 13/246,579, 5 pages.

Notice of Allowance, dated Jun. 23, 2014, regarding U.S. Appl. No. 13/246,579, 13 pages.

Canadian Intellectual Property Office Examination Report, dated Sep. 21, 2016 regarding Application No. 2,790,370, 3 pages.

English Translation of Notice of Reasons for Rejection regarding Japanese Patent Application No. 2012-211617, issued Jun. 7, 2016, 3 pages.

State Intellectual Property Office of PRC First Office Action and English Translation regarding Application No. 201210366091.1, issued Jul. 17, 2015, 16 pages.

Extended European Search Report, dated Aug. 17, 2016, regarding Application No. EP12185245.3. 8 pages.

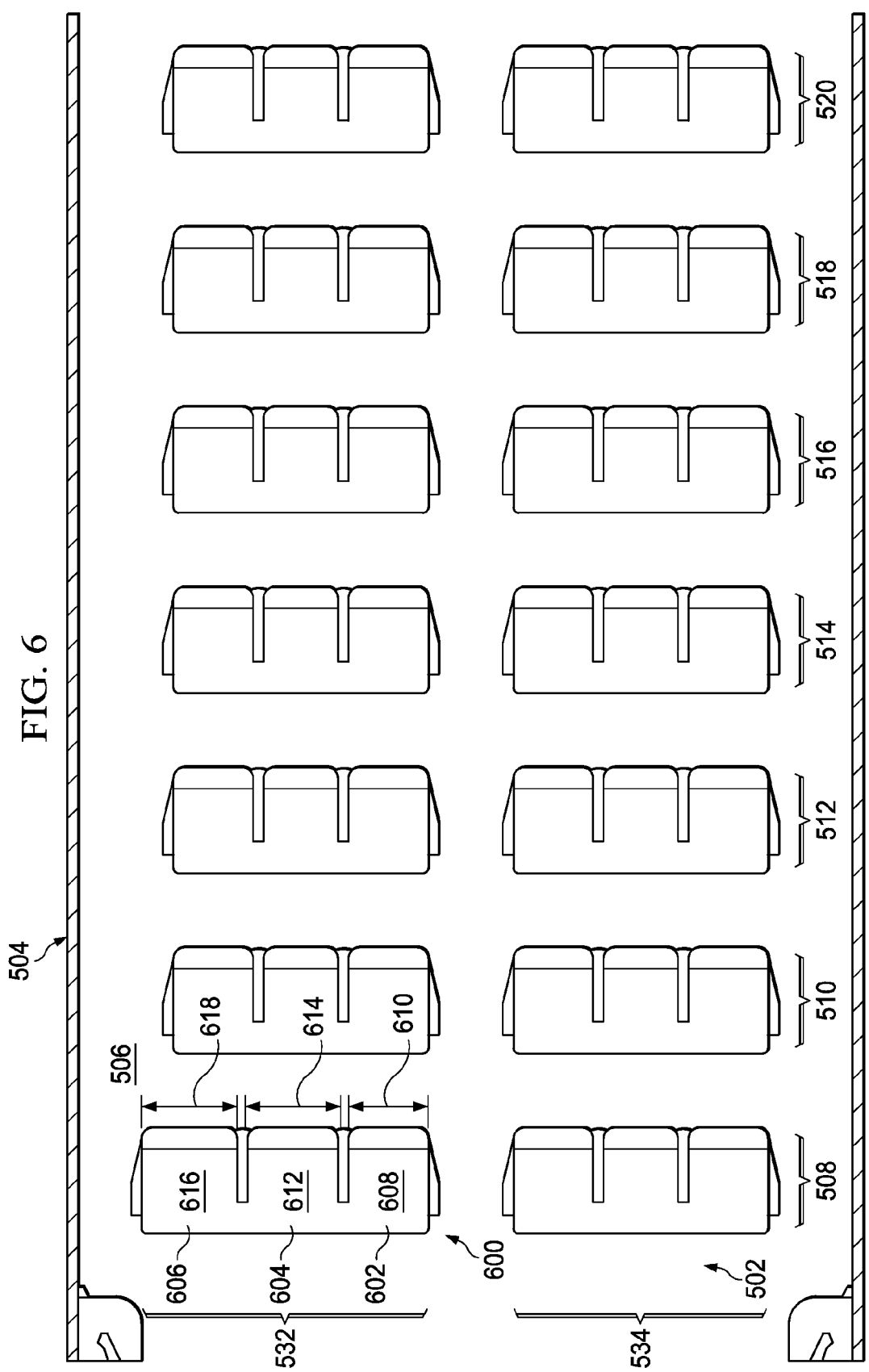

| PERCENTILE | WEIGHT- MALE AND FEMALE, POUNDS | WEIGHT- MALE, POUNDS | WEIGHT- FEMALE, POUNDS | MALE SHOULDER WIDTH, INCHES | FEMALE HIP WIDTH, INCHES |
|---|---|---|---|---|---|
| 98.0 | 287.3 | 305.2 | 265.3 | 23.0 | 20.9 |
| 98.1 | 291.4 | 306.4 | 267.1 | 23.1 | 20.9 |
| 98.2 | 293.2 | 307.6 | 268.1 | 23.2 | 21.0 |
| 98.3 | 297.4 | 308.6 | 271.7 | 23.2 | 21.1 |
| 98.4 | 300.5 | 310.2 | 275.0 | 23.2 | 21.1 |
| 98.5 | 305.2 | 312.8 | 275.8 | 23.3 | 21.1 |
| 98.6 | 307.5 | 314.3 | 278.1 | 23.3 | 21.2 |
| 98.7 | 310.1 | 317.1 | 279.1 | 23.4 | 21.3 |
| 98.8 | 312.9 | 319.9 | 285.6 | 23.4 | 21.4 |
| 98.9 | 315.5 | 322.5 | 290.4 | 23.6 | 21.5 |
| 99.0 | 319.8 | 325.8 | 301.2 | 23.6 | 21.9 |
| 99.1 | 321.2 | 327.6 | 312.1 | 23.6 | 22.0 |
| 99.2 | 323.7 | 327.7 | 319.1 | 23.7 | 22.0 |
| 99.3 | 327.7 | 334.1 | 320.4 | 23.9 | 22.3 |
| 99.4 | 337.9 | 340.8 | 322.3 | 23.9 | 22.8 |
| 99.5 | 341.8 | 343.0 | 335.8 | 24.0 | 23.3 |
| 99.6 | 342.3 | 344.5 | 341.7 | 24.1 | 23.4 |
| 99.7 | 344.7 | 345.4 | 342.3 | 24.6 | 23.6 |
| 99.8 | 345.8 | 346.2 | 343.5 | 25.3 | 24.2 |
| 99.9 | 346.1 | 352.4 | 344.5 | 25.5 | 25.3 |

FIG. 19
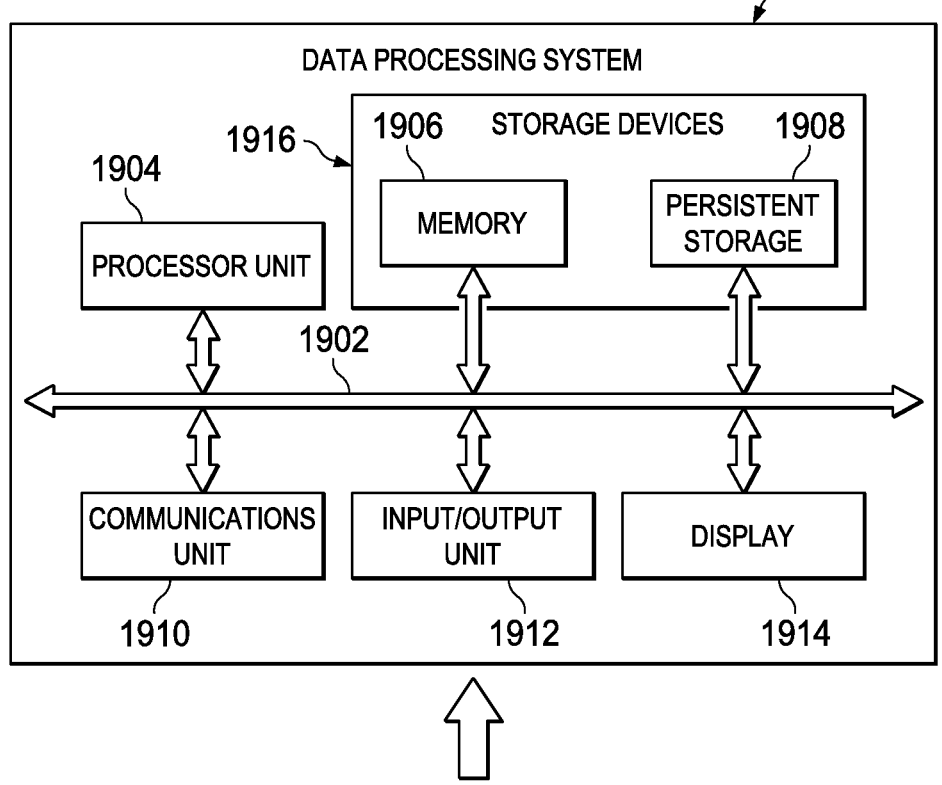
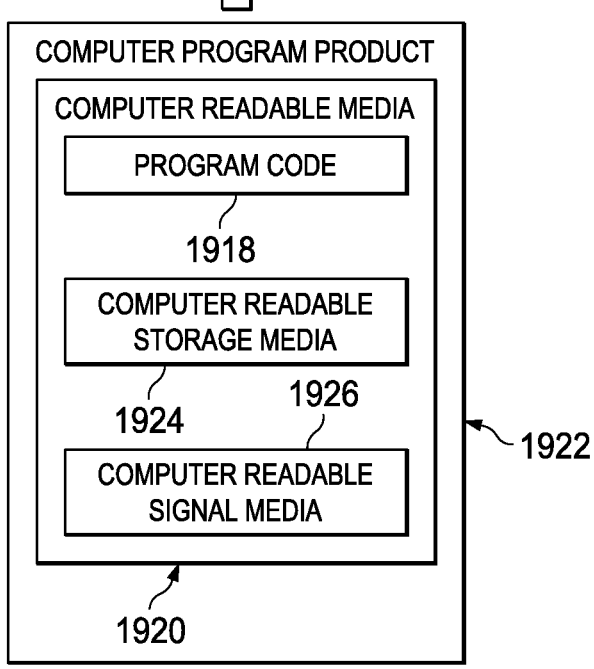

AIRCRAFT SEATING SYSTEMS

This application is a divisional application of U.S. application Ser. No. 13/246,579, entitled "Aircraft Seating Systems," filed Sep. 27, 2011.

BACKGROUND INFORMATION

1. Field

The present disclosure relates generally to aircraft and, in particular, to aircraft seating systems.

2. Background

Commercial aircraft often may include a passenger cabin. This cabin may be a section of the aircraft in which passengers travel. In commercial passenger aircraft, a passenger cabin may be divided into several parts. These parts may include, for example, without limitation, passenger areas, areas for flight attendants, a galley, storage for in-flight service, and other suitable sections. Seats within the passenger area may be arranged in rows and aisles. The amount of space provided on a per passenger basis may increase with the presence of a higher travel class. Different passenger areas for different travel classes may be divided using curtains and/or monuments.

In designing a passenger area, such as a cabin for an aircraft, maximizing the passenger density may be desirable. In other words, it may be desirable to fit as many passengers as possible in a passenger area while meeting various requirements for passenger seating. These requirements may include, for example, without limitation, a certain passenger space based on a class of travel, safety regulations, and other applicable requirements.

Passenger seating may be designed for passengers of a selected size. For example, without limitation, a seat for passengers may be designed to accommodate passengers within about the 95$^{th}$ percentile with respect to size. As a result, when a passenger has a size greater than about the 95$^{th}$ percentile, that passenger may be unable to use the seat.

Currently, airlines may place that passenger into two seats instead of just one seat in the aircraft because the passenger is unable to fit into a single seat. In some cases, the passenger may be asked to pay for an additional ticket because the second seat may no longer be available for sale to another passenger.

Sometimes passengers who require more than one seat may be unable to pay for the additional seat. Additionally, some passengers may refuse to pay for the additional seat, viewing the requirement to purchase an additional ticket as an unfair one. As a result, airlines may lose revenue and/or may have unhappy passengers when passengers are asked to pay additional fees for another seat.

Therefore, it would be advantageous to have a method and apparatus that takes into account at least some of the issues discussed above as well as possibly other issues.

SUMMARY

In one advantageous embodiment, a passenger aircraft seating apparatus comprises a plurality of seating systems and a frame. A first seating system in the plurality of seating systems may have different dimensions from a second seating system in the plurality of seating systems. The first seating system may have first dimensions and the second seating system may have second dimensions. The first dimensions may be configured to seat a first type of passenger and the second dimensions may be configured to seat a second type of passenger. The first type of passenger may have a hip width that is unable to fit in the second seating system. The frame may be configured to be connected to the plurality of seating systems.

In another advantageous embodiment, a seating unit for an aircraft comprises a plurality of seating systems, a number of adjustable arm rests, and a frame. The plurality of seating systems may have a first seating system having a first seat cushion and a first seat back and a second seating system having a second seat cushion and a second seat back. The first seating system in the plurality of seating systems may have different dimensions from the second seating system in the plurality of seating systems. The first seating system may have first dimensions and the second seating system may have second dimensions. The first dimensions may be configured to seat a first type of passenger and the second dimensions may be configured to seat a second type of passenger. The first type of passenger may have a hip width that is unable to fit in the second seating system. A first width of the first seating system may be about 20 to 26 inches and a second width of the second seating system may be about 16 to 19 inches. The frame may be configured to be connected to the plurality of seating systems.

In yet another advantageous embodiment, an aircraft seating system comprises a fuselage, a first type of seating system, a second type of seating system, a first plurality of seating systems, and a second plurality of seating systems. The fuselage may have an untapered section and a tapered section. The first type of seating system may have first dimensions configured to seat a first type of passenger. The second type of seating system may have second dimensions configured to seat a second type of passenger. The second dimensions may be different from the first dimension. The first type of passenger may have a hip width that is unable to fit in the second type of seating system. A first plurality of seating systems in the untapered section may have a selected number of seating systems in a selected row and a second plurality of seating systems located in one row of the tapered section may have at least one less seating system in the row as compared to the first plurality of seating systems in the selected row. The second plurality of seating systems may include at least one more seating system of the first type of seating system as compared to the first plurality of seating systems.

In yet another advantageous embodiment, a method for configuring an aircraft is provided. A fuselage design for the aircraft may be identified. A passenger area with seating units may be configured in which a number of the seating units may have a plurality of seating systems. A first seating system in the plurality of seating systems may have different dimensions from a second seating system in the plurality of seating systems. The first seating system may have first dimensions and the second seating system may have second dimensions. The first dimensions may be configured to seat a first type of passenger and the second dimensions may be configured to seat a second type of passenger. The first type of passenger may have a hip width that is unable to fit in the second seating system. The number of seating units also may have a frame configured to be connected to the plurality of seating systems.

In yet another advantageous embodiment, a method for assigning seating systems in an aircraft to passengers is provided. A type of passenger may be identified for a passenger. A seating system may be selected from one of a first seating system and may have first dimensions and a second seating system may have second dimensions. The first seating system may have first dimensions configured to seat a first type of passenger and the second seating system may have second dimensions that may be configured to seat a second type of passenger. The first type of passenger may have a hip width that is unable to fit in the second seating system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 6 is an illustration of a passenger area in accordance with an advantageous embodiment;

FIG. 19 is an illustration of a data processing system in accordance with an advantageous embodiment;

DETAILED DESCRIPTION

The different advantageous embodiments recognize and take into account one or more different considerations. For example, the different advantageous embodiments recognize and take into account that when a passenger requires more than one seat, another passenger may be unable to use the seat. As a result, a passenger may be bumped from a flight if the flight is full.

Additionally, the different advantageous embodiments recognize and take into account that passengers who may require more than one seat in economy class may be able to use a single seat in business or first class. However, oftentimes, a passenger may not be able to afford these more expensive seats. This situation may result in non-affordability of seats for some passengers, discomfort, frustration, and other undesirable results.

Thus, the different advantageous embodiments provide an aircraft seating system which may provide for increased flexibility in using space in the interior of an aircraft. For example, in one advantageous embodiment, an apparatus may comprise a plurality of seating systems in a frame. A first seating system in the plurality of seating systems may have a different characteristic from a second seating system in the plurality of seating systems. The frame may be configured to be connected to the plurality of seating systems.

The different advantageous embodiments recognize and take into account that changing the width of the fuselage may provide room needed to fit a desired number of seats, especially in a tapered section of the fuselage of the aircraft. The different advantageous embodiments recognize and take into account that this type of change may not be as easy to make as it seems.

For example, changing the width of a fuselage by an inch may result in much larger changes in weight and drag in the aircraft. Changing the width of a fuselage by one inch may increase the surface area of the aircraft by a much larger amount. The increase in surface area may increase the drag. Similar increases in weight also may occur. Thus, the different advantageous embodiments recognize and take into account that changing the width or other dimensions of the fuselage may be undesirable as well as possibly impractical.

Figure 1:
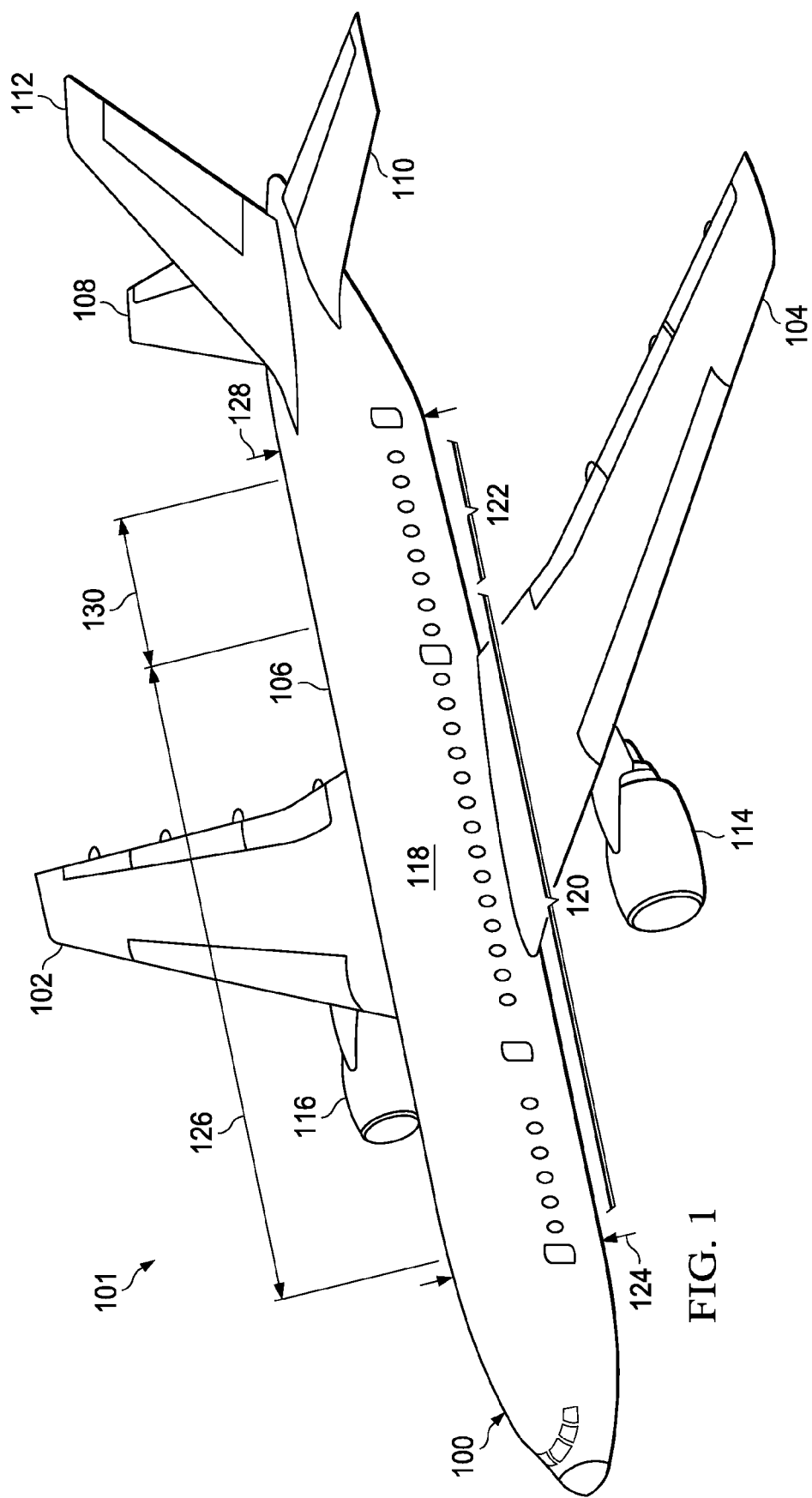
FIG. 1 is an illustration of an aircraft in accordance with an advantageous embodiment.

With reference now to the figures and, in particular, with reference now to FIG. 1, an illustration of an aircraft is depicted in accordance with an advantageous embodiment. In this illustrative example, aircraft 100 may be passenger aircraft 101 that is configured to carry passengers. Aircraft 100 may have wing 102 and wing 104 attached to fuselage 106. Aircraft 100 also may have horizontal stabilizer 108, horizontal stabilizer 110, and vertical stabilizer 112. Engine 114 may be attached to wing 104, and engine 116 may be attached to wing 102.

In these illustrative examples, one or more advantageous embodiments may be implemented in passenger cabin 118 located within fuselage 106. One or more of these advantageous embodiments may increase the comfort and/or number of passengers that may be carried within passenger cabin 118.

In this illustrative example, fuselage 106 may have untapered section 120 and tapered section 122 in which passenger cabin 118 is located. As illustrated, untapered section 120 has width 124 that may be substantially the same along length 126 of untapered section 120. As depicted, tapered section 122 has width 128 that may taper along length 130 of tapered section 122.

Figure 2:
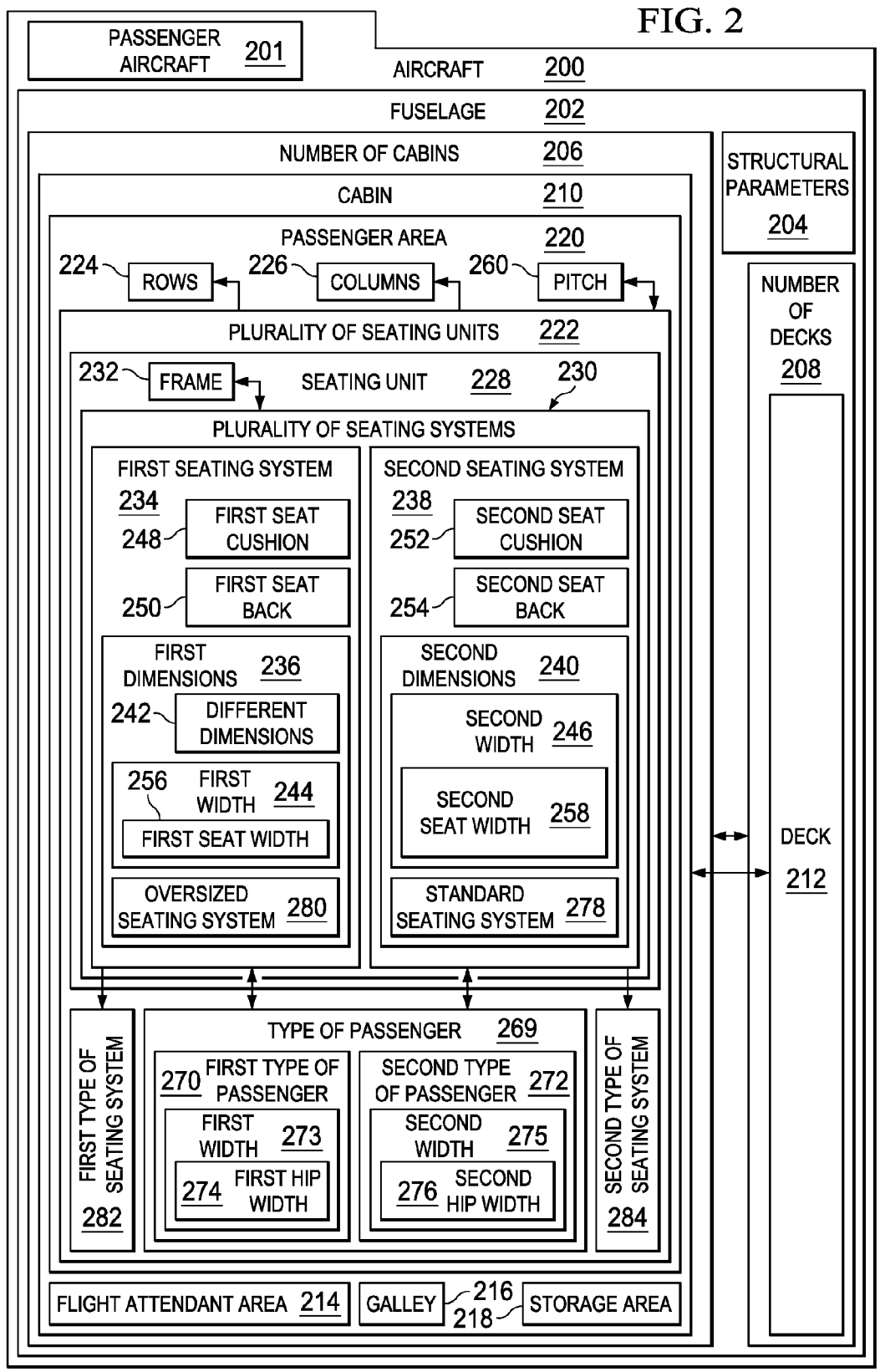
FIG. 2 is an illustration of a block diagram of an aircraft in accordance with an advantageous embodiment.

With reference now to FIG. 2, an illustration of a block diagram of an aircraft is depicted in accordance with an advantageous embodiment. In this illustrative example, aircraft 100 in FIG. 1 may be an example of an implementation for aircraft 200 shown in block form in FIG. 2.

In this illustrative example, aircraft 200 may be passenger aircraft 201 and may have fuselage 202 and may have structural parameters 204 for fuselage 202. Structural parameters 204 may include, for example, without limitation, at least one of weight, area of fuselage cross section, perimeter of the fuselage, shape of the cross section, structural reinforcements, and other suitable parameters.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In these illustrative examples, number of cabins 206 may be present within fuselage 202. In this illustrative example, number of cabins 206 may be located on number of decks 208. Each deck in number of decks 208 may be located on a different level in aircraft 200. As depicted, cabin 210 in number of cabins 206 may be located on deck 212 in number of decks 208.

Number of cabins 206 may have various areas. For example, without limitation, cabin 210 in number of cabins 206 may include, for example, without limitation, flight attendant area 214, galley 216, storage area 218, passenger area 220, and other suitable areas.

Plurality of seating units 222 may be present in passenger area 220 in cabin 210. Plurality of seating units 222 may be arranged in rows 224 and columns 226 in passenger area 220.

In this illustrative example, seating unit 228 in plurality of seating units 222 may comprise plurality of seating systems 230 and frame 232.

First seating system 234 in plurality of seating systems 230 for seating unit 228 may have first dimensions 236. Second seating system 238 for plurality of seating systems 230 may have second dimensions 240.

As depicted, first dimensions 236 may be different from second dimensions 240. In other words, first dimensions 236 may be different dimensions 242 from second dimensions 240. In particular, first width 244 in first dimensions 236 for first seating system 234 may be different from second width 246 in second dimensions 240 for second seating system 238.

As one illustrative example, first width 244 may be greater than second width 246. For example, first width 244 may be from about 21 inches to about 25 inches while second width 246 may be about 18 inches. In this illustrative example, second width 246 may be a standard width. The standard width may be one configured to fit a passenger that is within about the 95$^{th}$ percentile in size. A passenger that is within the 95$^{th}$ percentile in size may be a passenger that has a size that is smaller than about the largest 5 percent of passenger sizes.

In these illustrative examples, frame 232 may be configured to be connected to plurality of seating systems 230. As used herein, a first component, such as frame 232, "connected to" a second component, such as a seating system in plurality of seating systems 230, means that the first component, frame 232, can be connected directly or indirectly to the second component, the seating system in plurality of seating systems 230. In other words, additional components may be present between the first component, frame 232, and the second component, the seating system in plurality of seating systems 230. The first component, frame 232, may be considered to be indirectly connected to the second component, the seating system in plurality of seating systems 230, when one or more additional components are present between the two components. When the first component, frame 232, is directly connected to the second component, the seating system in plurality of seating systems 230, no additional components may be present between the two components.

As depicted, first seating system 234 may have first seat cushion 248 and first seat back 250. Second seating system 238 may have second seat cushion 252 and second seat back 254. First width 244 may be first seat width 256 for first seat cushion 248. Second width 246 may be second seat width 258 for second seat cushion 252.

First seat cushion 248 and second seat cushion 252 may be manufactured using any materials currently used for seat cushions in aircraft. In a similar fashion, first seat back 250 and second seat back 254 also may be constructed using any materials currently used for seat backs in aircraft.

Frame 232 may be constructed from any material suitable for use to support plurality of seating systems 230 with passengers or other loads. For example, frame 232 may be constructed from at least one of a composite material, aluminum, steel, titanium, and other suitable types of materials. In these illustrative examples, the material selected may be one that is capable of providing a desired amount of structural strength to support plurality of seating systems 230 and a number of passengers. In these illustrative examples, the selection of the material may be one designed to support passengers having a size greater than about a 95$^{th}$ percentile based on a configuration of frame 232.

Additionally, pitch 260 may be adjusted between rows 224 for plurality of seating units 222. For example, pitch 260 may be increased to provide additional leg room in some places within passenger area 220. For example, increased pitch may be present to provide increased leg room for seating unit 228 as compared to seating units in other rows or areas in these illustrative examples.

In these illustrative examples, a seating system in plurality of seating systems 230 may be selected for a passenger based on type of passenger 269. In these illustrative examples, type of passenger 269 is based on dimensions of a passenger. These dimensions may be, for example, without limitation, width, hip width, shoulder width, height, and/or other suitable dimensions.

First seating system 234 may be assigned to first type of passenger 270, while second seating system 238 may be assigned to second type of passenger 272. In these illustrative examples, first type of passenger 270 may be unable to fit into second seating system 238 configured for second type of passenger 272.

In these illustrative examples, first dimensions 236 may be configured to seat first type of passenger 270, while second dimensions 240 may be configured to seat second type of passenger 272. When first type of passenger 270 is larger than second type of passenger 272, second type of passenger 272 also may be able to use first seating system 234.

With first seating system 234 having first dimensions 236 configured to fit first type of passenger 270 when second seating system 238 with second dimensions 240 is unable to seat first type of passenger 270, seating systems may be assigned to first type of passenger 270 without requiring assigning another seating system. For example, if first type of passenger 270 is assigned to second seating system 238, then second type of passenger 272 may require another seating system, such as second seating system 238, to accommodate first type of passenger 270.

As a result, fewer passengers may be seated without seating units, such as seating unit 228. In these illustrative examples, first width 244, and in particular, first seat width 256, may be configured to fit first width 273 of first type of passenger 270. In this illustrative example, first width 273 may be first hip width 274 of first type of passenger 270. Additionally, first seat width 256 also may be able to fit second width 275 of second type of passenger 272. As depicted, second width 275 may be second hip width 276 of second type of passenger 272. In these illustrative examples, second width 246, and in particular, second seat width 258 in second seating system 238, may be unable to fit first hip width 274 for first type of passenger 270, but able to fit second hip width 276 of second type of passenger 272.

In the depicted examples, second seating system 238 may be standard seating system 278 while first seating system 234 may be oversized seating system 280. Standard seating system 278 may be configured to receive second type of passenger 272 having second hip width 276 within about the 98$^{th}$ percentile in hip widths. A hip width that is within about the 98$^{th}$ percentile means that the hip width is less than about the largest 2 percent of hip widths. With this type of configuration, oversized seating system 280 may be configured to seat first type of passenger 270 having first hip width 274 that is greater than about the 98 percentile. Of course, other percentiles may be selected into other implementations.

As another illustrative example that is non-limiting, standard seating system 278 may be configured to seat second type of passenger 272 with second hip width 276 that is within about the 95$^{th}$ percentile. With this example, oversized seating system 280 may be configured to seat first type of passenger 270 with first hip width 274 that is greater than about the 95$^{th}$ percentile.

Further, with oversized seating system 280, this seating system may be configured to also accommodate first type of passenger 270 with first hip width 274 that is in the range of hip widths greater than about the 99$^{th}$ percentile. Further, although these illustrative examples discuss accommodating passengers based on hip width, other measurements for the passengers may be taken into account. For example, without limitation, height, shoulder width, and other suitable measurements for passengers may be used.

In these illustrative examples, first seating system 234 may be first type of seating system 282 in plurality of seating units 222. Second seating system 238 may be second type of seating system 284 in plurality of seating units 222.

The illustration of aircraft 200 in FIG. 2 is not meant to imply physical or architectural limitations to the manner in which an advantageous embodiment may be implemented. Other components in addition to, and/or in place of, the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, aircraft 200 may have a single deck, two decks, or some other number of decks, depending on the particular implementation. Further, in some illustrative examples, passenger area 220 may only have a single column of seats.

Further, other dimensions in first dimensions 236 and second dimensions 240 may be different within seating unit 228. For example, the depth of the seat cushions may be different from each other. Also, the width of first seat back 250 and second seat back 254 may be different or the same width depending on the particular implementation.

In yet other illustrative examples, other dimensions for other components of a seating system also may be different in first dimensions 236 and second dimensions 240. For example, without limitation, a height of a seat cushion relative to a seat floor may be varied in at least one of first dimensions 236 and second dimensions 240. The seat floor may be a floor in the aircraft on which the seating systems are placed. The height may be varied to accommodate passengers of different heights.

In still another illustrative example, although plurality of seating units 222 has been described as being arranged by rows and columns, the configuration of plurality of seating units 222 may be described in different ways. For example, plurality of seating units 222 may be arranged in groups in cabin 210. In another example, plurality of seating units 222 may be described as being arranged by rows and groupings on a left hand portion of cabin 210 and a right hand portion of cabin 210.

As another illustrative example, first seating system 234 may have first seat width 256 that may be at least about 20 inches, and second seating system 238 may have second seat width 258 that may be from about 16 inches to about 19 inches. As a more specific example, first seat width 256 may be from about 20 inches to about 26 inches. In still another illustrative example, first seating system 234 may have first seat width 256 that may be configured to seat first type of passenger 270 being greater than about the 98$^{th}$ percentile in first hip width 274.

In yet another illustrative example, first width 244 of first seating system 234 may be configured to fit first width 273 of first type of passenger 270 in which first width 273 may be a shoulder width of first type of passenger 270 instead of or in addition to first hip width 274. As another illustrative example, second width 275 may be a shoulder width of second type of passenger 272 instead of or in addition to second hip width 276.

Figure 3:
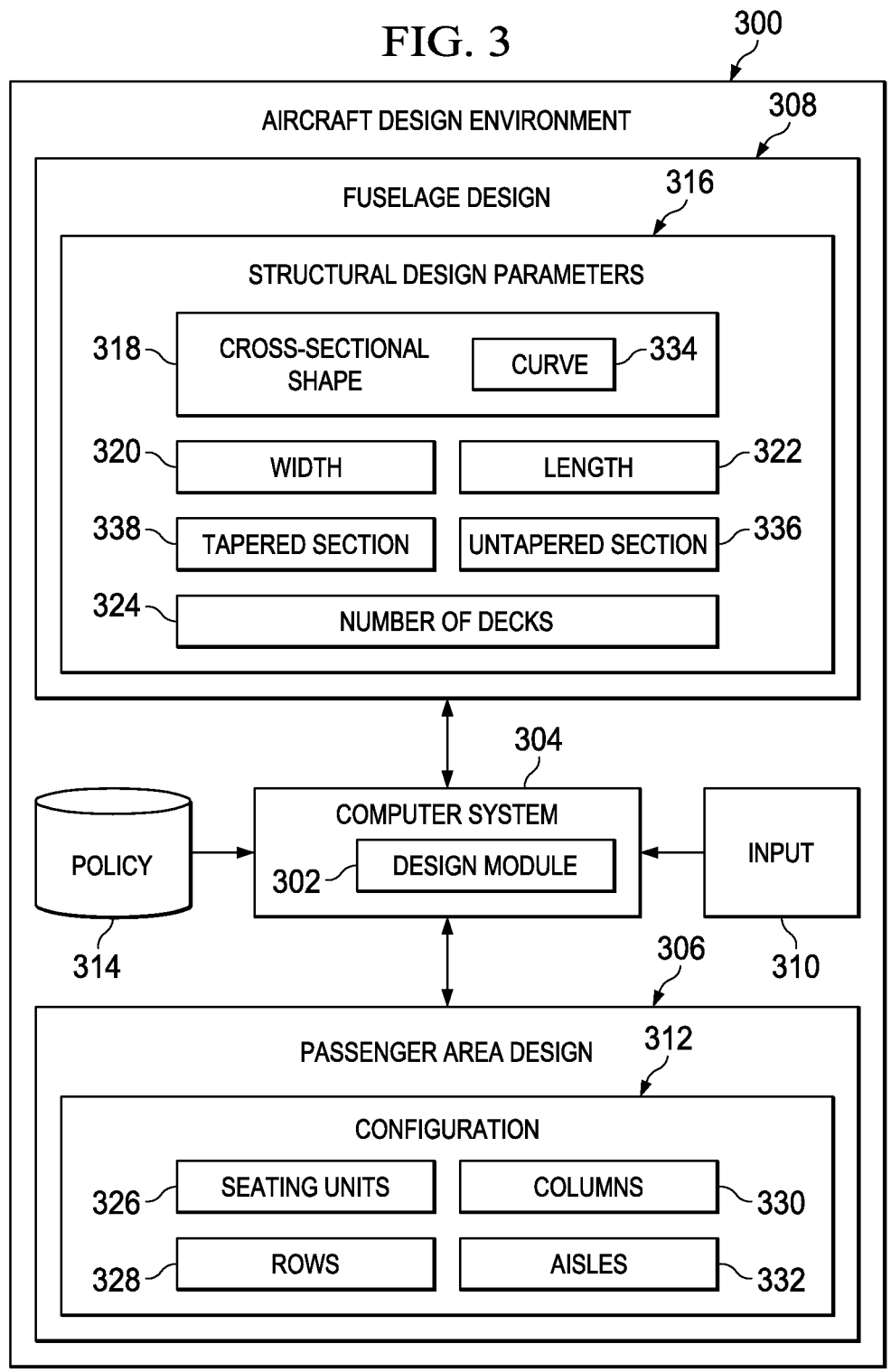
FIG. 3 is an illustration of an aircraft design environment in accordance with an advantageous embodiment.

With reference now to FIG. 3, an illustration of an aircraft design environment is depicted in accordance with an advantageous embodiment. In this illustrative example, aircraft design environment 300 is an example of a design environment that may be used to design aircraft 200 shown in block form in FIG. 2. In particular, aircraft design environment 300 may be used to design configurations of passenger area 220.

As depicted, design module 302 may generate passenger area design 306 and/or fuselage design 308 based on input 310. Passenger area design 306 may be a design for passenger area 220 in aircraft 200 shown in block form in FIG. 2. Fuselage design 308 may be a design for fuselage 202 of aircraft 200 shown in block form in FIG. 2.

Passenger area design 306 may be generated based on fuselage design 308 in these illustrative examples. In other illustrative examples, passenger area design 306 may affect the design of fuselage design 308.

As depicted, input 310 may specify various design goals or parameters. For example, without limitation, input 310 may include passenger density, number of passengers, aircraft size, and other suitable types of input. In some advantageous embodiments, input 310 may include fuselage design 308.

Design module 302 may be implemented using software, hardware, or a combination of the two. In particular, design module 302 may be located in computer system 304. Computer system 304 may comprise a number of computers. When more than one computer is present in computer system 304, those computers may be in communication with each other.

With input 310, design module 302 may generate configuration 312 for passenger area design 306. Configuration 312 for passenger area design 306 may describe a passenger area, such as passenger area 220 shown in block form in FIG. 2.

Passenger area design 306 may be created from input 310 taking into account policy 314. Policy 314 may be a set of rules and may include data to create passenger area design 306. For example, without limitation, policy 314 may specify a desired density or number of passengers that may be carried within passenger area design 306. As another example, policy 314 also may include rules as to the amount of space desired for a particular passenger. In yet another illustrative example, policy 314 may identify a number of seating systems that may be needed to accommodate passengers who may be unable to fit into a seat size selected as a standard seat size for the aircraft. In these illustrative examples, a standard seat size may be one that fits passengers up to about the $95^{th}$ percentile in size. In other words, a standard seat size may fit passengers who have a size that is about the $95^{th}$ percentile or less.

Policy 314 also may take into account structural design parameters 316 in fuselage design 308. Structural design parameters 316 may include, for example, without limitation, cross-sectional shape 318, width 320, length 322, number of decks 324, and other suitable parameters. With an identification of fuselage design 308, passenger area design 306 may be designed to have configuration 312 based on policy 314.

In particular, configuration 312 may include seating units 326, rows 328, columns 330, aisles 332, and other suitable components for passenger area design 306. Seating units 326 may be of different types selected for use in a passenger area. Seating units 326 may include, for example, without limitation, seating units, such as seating unit 228 shown in block form in FIG. 2.

Rows 328 may identify the number of rows and the type of seating units 326 present in rows 328. Columns 330 may identify the number of columns in passenger area design 306. Aisles 332 may identify spaces in which passengers and crew may traverse within passenger design area 306.

In this manner, design module 302 may generate configuration 312 for passenger area design 306 taking into account fuselage design 308. In selecting seating units 326 for configuration 312 for passenger area design 306, design module 302 may take into account width 320.

For example, width 320 may be untapered or may vary for passenger area design 306. When width 320 is substantially untapered along a portion of length 322, untapered section 336 may be present in fuselage design 308 for passenger area design 306. If width 320 varies along a portion of length 322, tapered section 338 may be present in fuselage design 308.

In other words, untapered section 336 may be a section in fuselage design 308 that has an untapered value for width 320 along a portion of length 322. Tapered section 338 may be a portion of fuselage design 308 in which width 320 decreases in value along a portion of length 322.

As another example, cross-sectional shape 318 also may be taken into account. Curve 334 in cross-sectional shape 318 may affect, for example, without limitation, the amount of headroom in passenger area design 306.

Seating units 326 may be selected for tapered section 338 in a manner that may increase seat sizes for some seating systems in some seating units that may be located in tapered section 338. Additionally, a location of a deck in number of decks 324 also may affect the selection of seating units 326 in configuration 312 for a particular deck. For example, if a deck in number of decks 324 is located higher within cross-sectional shape 318 of fuselage design 308 as compared to another deck, the curvature in the walls at that location for the deck may reduce headroom.

As a result, in selecting seating units 326 for configuration 312 of passenger area design 306, a seating unit, such as seating unit 228 shown in block form in FIG. 2, may be used for seating units that may be close to a wall in fuselage design 308. In this manner, configuration 312 may increase the number of passengers, reduce wasted space, identify seating to increase revenues, and other suitable parameters.

The illustration of aircraft design environment 300 in FIG. 3 is not meant to imply limitations to the manner in which an aircraft design environment may be implemented. In some illustrative examples, configuration 312 also may include monuments and other structures. For example, without limitation, configuration 312 may include walls, closets, storage areas, galleys, and other suitable components.

Figure 4:
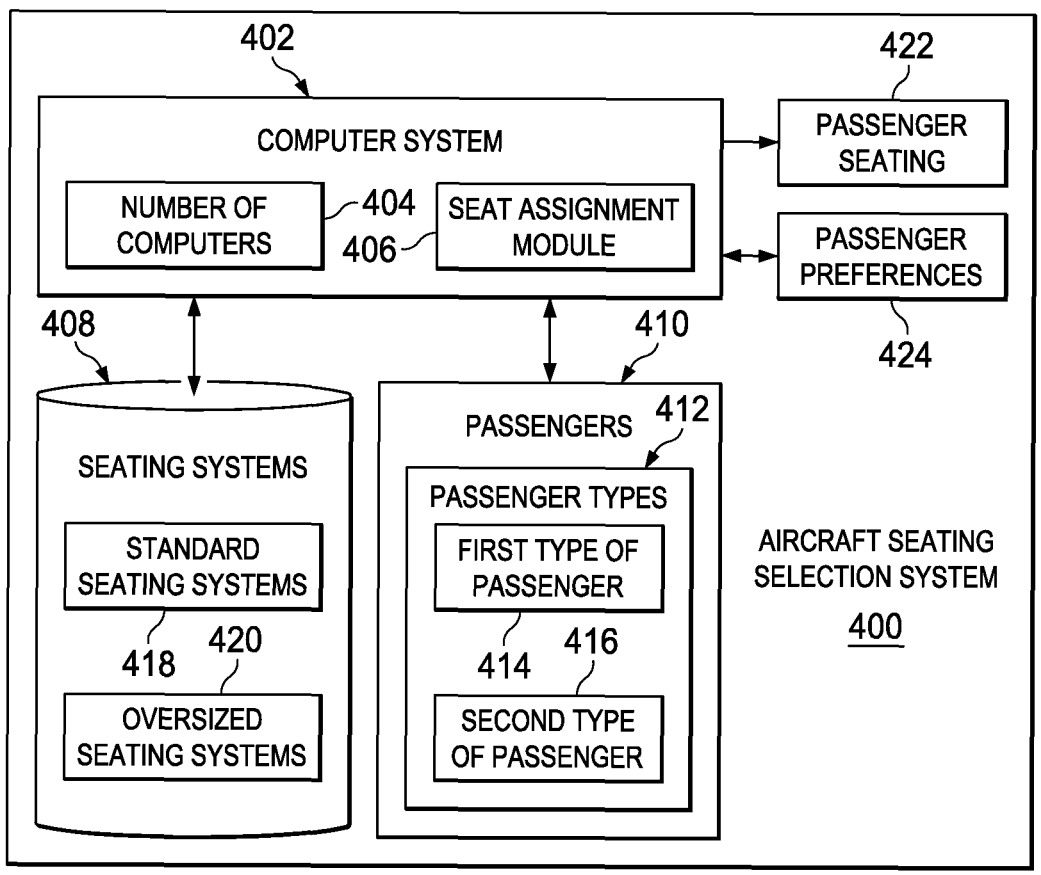
FIG. 4 is an illustration of an aircraft seating selection system in accordance with an advantageous embodiment.

Turning next to FIG. 4, an illustration of an aircraft seating selection system is depicted in accordance with an advantageous embodiment. In this illustrative example, aircraft seating selection system 400 comprises computer system 402. Computer system 402 may take the form of number of computers 404. Seat assignment module 406 may be present in computer system 402. Seat assignment module 406 may be hardware, software, or a combination of the two.

Seat assignment module 406 may be configured to assign seating systems 408 to passengers 410 in these illustrative examples. Seating systems 408 may be assigned to passengers 410 based on passenger types 412.

As depicted, passenger types 412 include first type of passenger 414 and second type of passenger 416. Of course, in other illustrative examples, additional passenger types may be present depending on the particular implementation.

Seat assignment module 406 identifies a seating system from seating systems 408 based on passenger types 412 for a particular passenger.

In these illustrative examples, seating systems 408 may comprise standard seating systems 418 and oversized seating systems 420. First type of passenger 414 may be assigned to oversized seating systems 420 while second type of passenger 416 may be assigned to standard seating systems 418.

The assignments made by seat assignment module 406 may create passenger seating 422. In addition, in generating passenger seating 422, seat assignment module 406 may also take into account passenger preferences 424. For example, a passenger preference in passenger preferences 424 may request a particular aisle, row, class, seat type, an aisle seating system, a window seating system, or other preferences.

In some illustrative examples, seat assignment module 406 may assign second type of passenger 416 to standard seating systems 418 based on a request. With this type of assignment, a higher price may be charged to that particular passenger.

Figure 5:
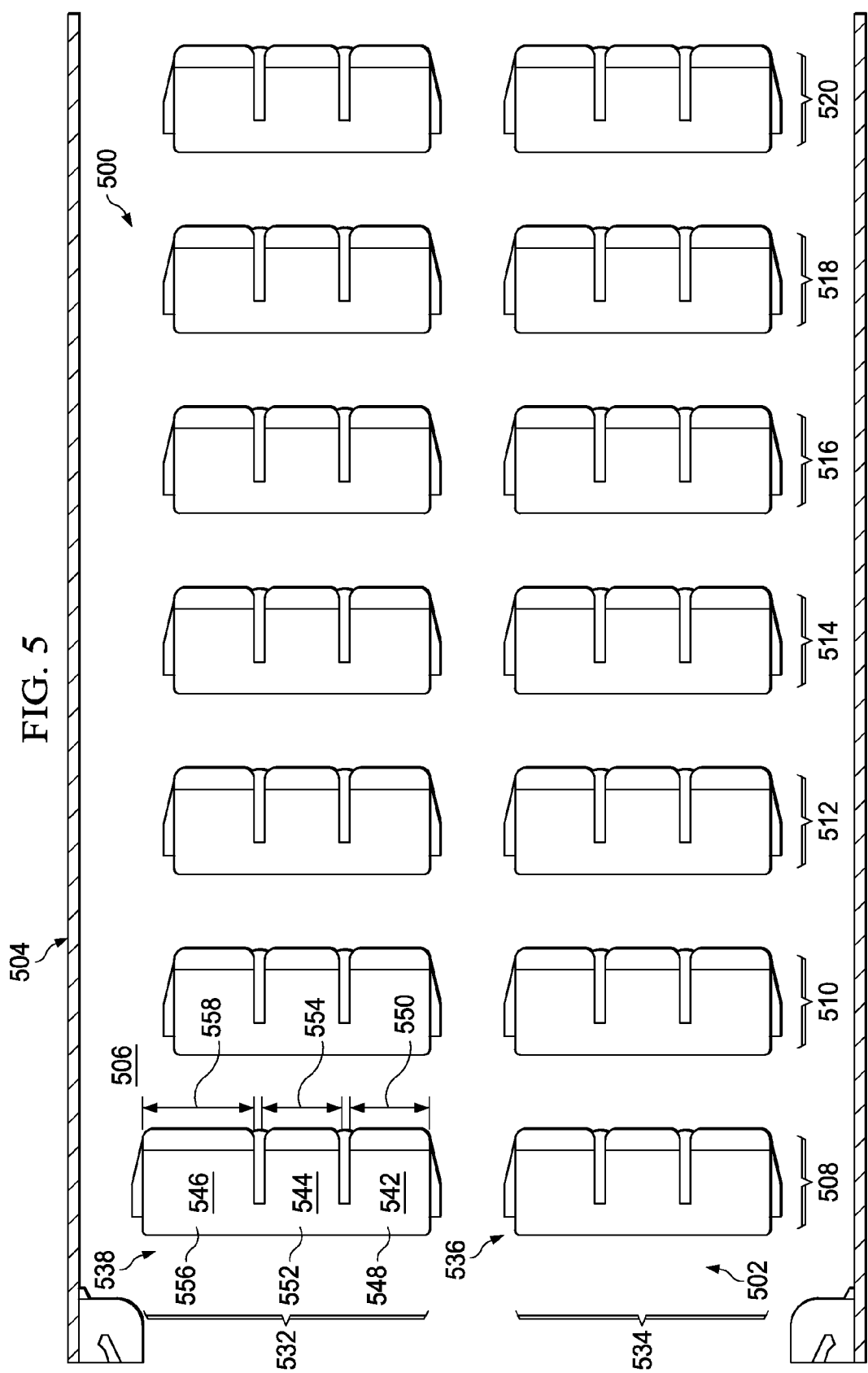
FIG. 5 is an illustration of a passenger area in accordance with an advantageous embodiment.

With reference now to FIG. 5, an illustration of a passenger area is depicted in accordance with an advantageous embodiment. In this illustrative example, passenger area 500 may be located in cabin 502 of aircraft 504. Passenger area 500 may be an example of a physical implementation of passenger area 220 illustrated in block form in FIG. 2. In particular, passenger area 500 may be an example of an implementation of configuration 312 in FIG. 3.

In this illustrative example, plurality of seating units 506 may be located in passenger area 500. In this illustrative example, plurality of seating units 506 may be arranged by rows and columns. As depicted, rows 508, 510, 512, 514, 516, 518, and 520 may be present in passenger area 500. Columns 532 and 534 with aisle 536 may be present.

As depicted, seating unit 538 may be located in row 508 of passenger area 500. Seating unit 538 may be an example of a physical implementation for seating unit 228 shown in block form in FIG. 2.

In this illustrative example, seating unit 538 may include seating system 542, seating system 544, and seating system 546. Seating systems 542, 544, and 546 may be attached to a single frame (not shown) in this illustrative example. Seat cushion 548 for seating system 542 may have width 550. Seat cushion 552 for seating system 544 may have width 554. Seat cushion 556 for seating system 546 may have width 558. In these illustrative examples, width 550 and width 554 may be the same. Width 558 may be greater than width 550 and width 554.

With width 558, passengers that are unable to fit into seating system 542 or seating system 544 may be able to use seating system 546. In this manner, seating system 542 and seating system 544 may not be assigned to a passenger when the passenger is unable to fit into just one of seating system 542 or seating system 544.

Further, when width 558 is greater than width 554 and width 550, seating system 546 may be considered a higher level of seating as compared to seating system 544 and seating system 542. As a result, increased fees may be charged for a passenger desiring seating system 546. However, this increased seating may be less than the cost of an extra ticket or for a seat in a higher class in the cabin.

With reference now to FIG. 6, an illustration of a passenger area is depicted in accordance with an advantageous embodiment. In this illustrative example, another configuration for passenger area 500 is depicted in this figure.

Seating unit 600 may be used in place of seating unit 538 in FIG. 5. Seating unit 600 may comprise seating system 602, seating system 604, and seating system 606. In this illustrative example, seat cushion 608 may have width 610, seat cushion 612 may have width 614, and seat cushion 616 may have width 618. Width 614 may be the same as width 618.

Width 618 and width 614 may be greater than width 610 in these illustrative examples. For example, width 610 may be about 18 inches, while width 614 and width 618 may be about 21 inches. With this configuration of seating unit 600, seating system 604 and seating system 606 may be considered to be oversized seats in seating unit 600.

Figure 7A:
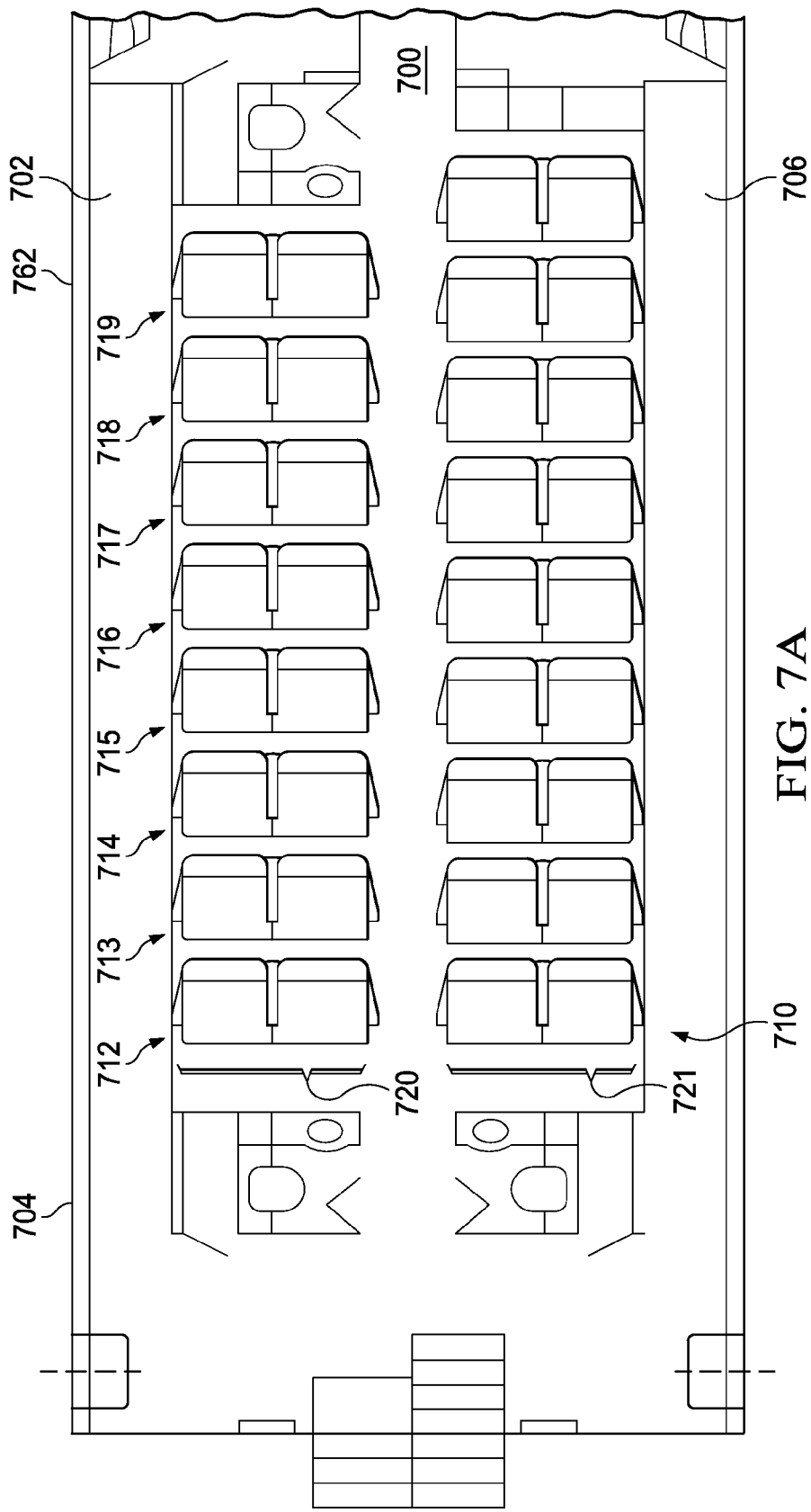
FIGS. 7A and 7B are illustrations of a passenger area in accordance with an advantageous embodiment.
Figure 7B:
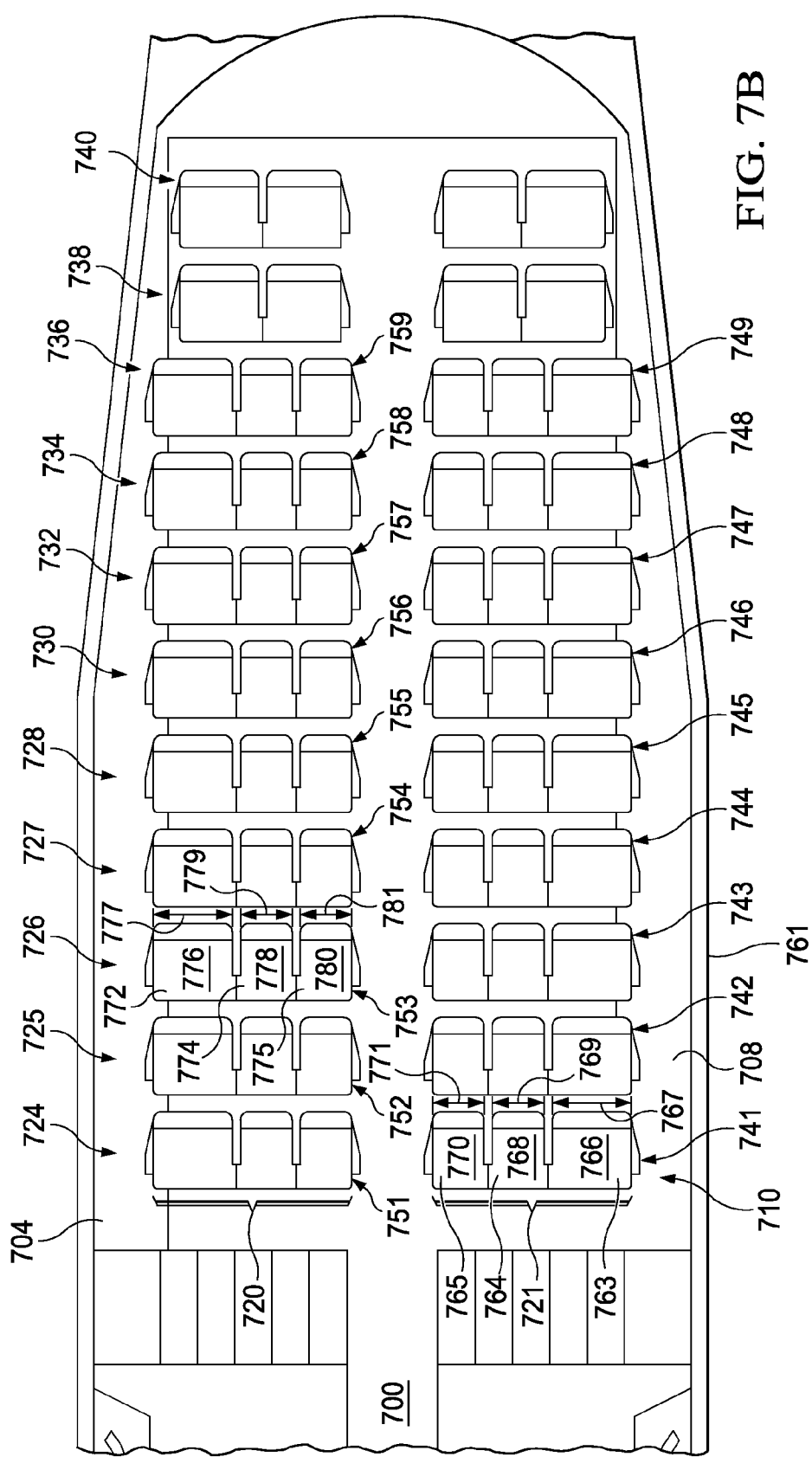

Turning next to FIGS. 7A and 7B, illustrations of a passenger area are depicted in accordance with an advantageous embodiment. In this depicted example, passenger area 700 is illustrated within cabin 702 for aircraft 704. Passenger area 700 may be an example of a physical implementation of configuration 312 for passenger area design 306 in FIG. 3.

In this particular example, passenger area 700 may be divided into section 706 and section 708. These different sections may offer different classes of seating, types of seating, or other variations depending on the particular implementation. Passenger area 700 may have plurality of seating units 710 located within section 706 and section 708.

As depicted, plurality of seating units 710 may be arranged in rows and columns. In this illustrative example, rows 712, 713, 714, 715, 716, 717, 718, and 719 may be present in columns 720 and 721 in section 706 of passenger area 700. Rows 724, 725, 726, 727, 728, 730, 732, 734, 736, 738, and 740 may be present in columns 720 and 721 in section 708 of passenger area 700.

In these illustrative examples, seating units 741, 742, 743, 744, 745, 746, 747, 748, 749, 751, 752, 753, 754, 755, 756, 757, 758, and 759 in plurality of seating units 710 may be implemented using seating unit 228 shown in block form in FIG. 2. In this manner, the seating systems adjacent to side 761 and side 762 of aircraft 704 may be larger in width than other seating systems.

For example, seating unit 741 may have seating system 763, seating system 764, and seating system 765. Seat cushion 766 in seating system 763 may have width 767. Seat cushion 768 in seating system 764 may have width 769. Seat cushion 770 in seating system 765 may have width 771. As can be seen in this illustrative example, width 767 may be greater than width 769 or width 771. Seating system 763 may be adjacent to side 762.

In this illustrative example, width 767 for seat cushion 766 in seating system 763 may be about 25 inches. Width 769 for seat cushion 768 in seating system 764 and width 771 for seat cushion 770 in seating system 765 may be about 18 inches.

As another illustrative example, seating unit 753 may have seating system 772, seating system 774, and seating system 775. Seat cushion 776 in seating system 772 may have width 777 and seat cushion 778 in seating system 774 may have width 779. Seat cushion 780 in seating system 775 may have width 781.

In these illustrative examples, width 777 may be greater than width 779 or width 781. In these illustrative examples, width 777 may be about 25 inches. Width 779 and width 781 may be about 18 inches.

As can be seen, the seating systems adjacent to side 761 and side 762 may have a larger width as opposed to other seating systems in the seating unit. In these illustrative examples, the larger width may take into account reduced headroom that may be present in the curvature of aircraft 704 at side 761 and side 762.

As a result, with larger widths for seat cushions in seating systems, a higher level of comfort may be provided in section 708 as compared to other seating systems. Further, these larger seating systems may be used by oversized passengers that may otherwise need two seating systems. The pricing of a seating system, such as seating system 763, may be greater than the price for seating system 764. However, if section 706 is a higher class of seating than section 708, seating system 763 may still be less expensive than seating systems in section 706.

Figure 8:
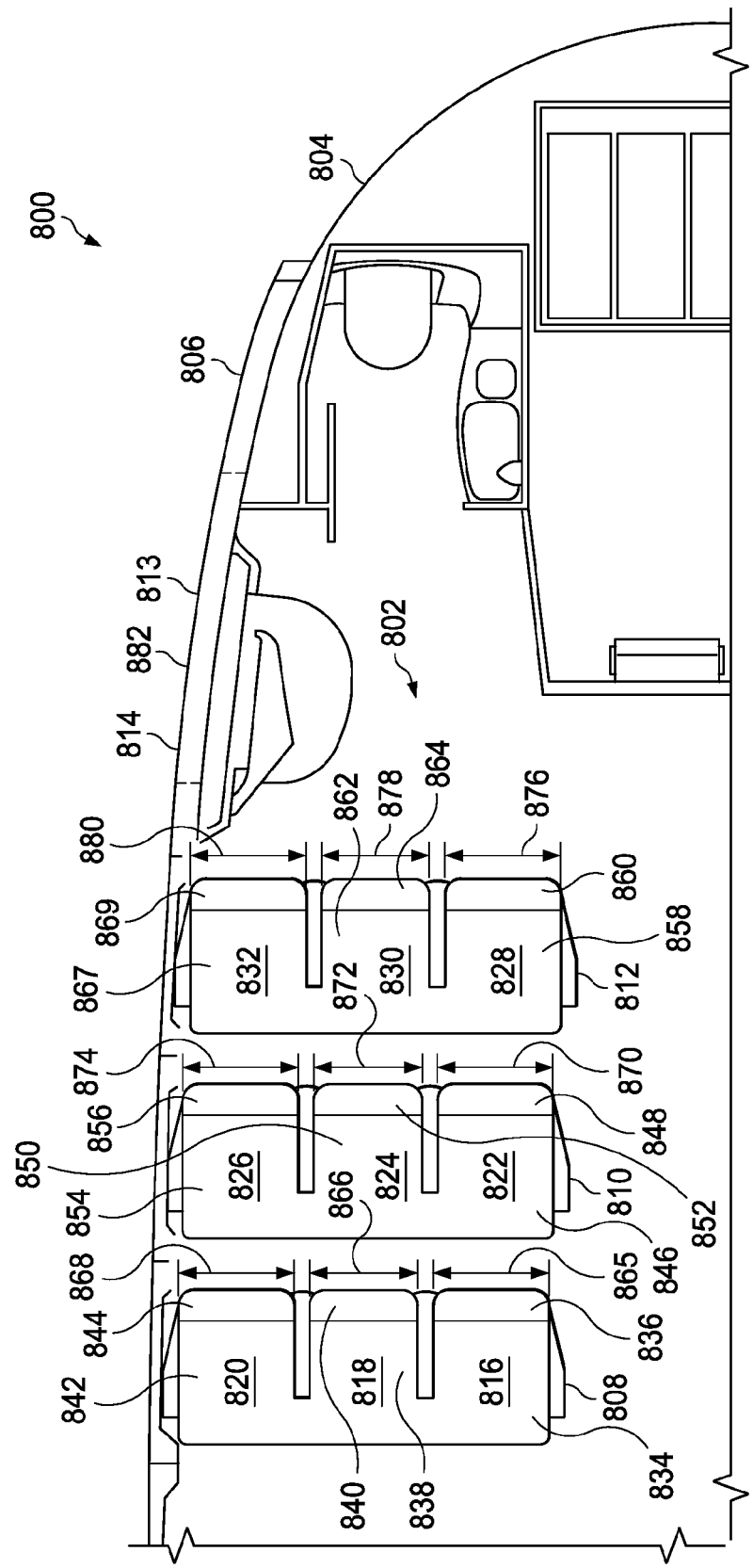
FIG. 8 is an illustration of a passenger area with seating units in accordance with an advantageous embodiment.

With reference now to FIG. 8, an illustration of a passenger space with seating units is depicted in accordance with an advantageous embodiment. Passenger area 800 may be an example of a physical implementation for configuration 312 in passenger area design 306 in FIG. 3.

In this illustrative example, passenger area 800 includes plurality of seating units 802. In this illustrative example, plurality of seating units 802 may be located in aft section 804 of aircraft 806. Plurality of seating units 802 may include seating unit 808, seating unit 810, and seating unit 812 in this illustrative example. In this depicted example, cabin wall 813 may have curve 814. With curve 814, seating units 808, 810, and 812 may have different widths depending on curve 814 of cabin wall 813.

As depicted, seating unit 808 may comprise seating system 816, seating system 818, and seating system 820. Seating unit 810 may comprise seating system 822, seating system 824, and seating system 826. Seating unit 812 may comprise seating system 828, seating system 830, and seating system 832. As illustrated, seating system 816 may comprise seat cushion 834 and seat back 836. Seating system 818 may comprise seat cushion 838 and seat back 840. Seating unit 820 may comprise seat cushion 842 and seat back 844.

In seating unit 810, seating system 822 may comprise seat cushion 846 and seat back 848. Seating system 824 may comprise seat cushion 850 and seat back 852. Seating system 826 may comprise seat cushion 854 and seat back 856. In this illustrative example, seating system 828 in seating unit 812 may comprise seat cushion 858 and seat back 860. Seating system 830 may comprise seat cushion 862 and seat back 864. Seating system 832 may comprise seat cushion 867 and seat back 869.

In these illustrative examples, both seat cushion 834 and seat back 836 may have width 865. Seat cushion 838 and seat back 840 may have width 866. Both seat cushion 842 and seat back 844 may have width 868.

In seating system 822, seat cushion 846 and seat back 848 may have width 870. Seat cushion 850 and seat back 852 may have width 872. Seat cushion 854 and seat back 856 may have width 874. Seat cushion 858 and seat back 860 may have width 876 in these illustrative examples. Seat cushion 862 and seat back 864 may have width 878. In seating system 832, seat cushion 867 and seat back 869 may have width 880.

In these illustrative examples, widths 865, 866, 870, 872, 876, and 878 may be about 18 inches. Width 868 may be about 24 inches. Width 874 may be about 23.5 inches. Width 880 may be about 22 inches.

The width of seating systems along side 882 of cabin wall 813 may have different widths to take into account curve 814 of cabin wall 813. In this manner, larger seat widths may be employed or applicable when taking into account curve 814 of cabin wall 813. Further, these different widths also may be used to accommodate passengers of different sizes that may not fit into a seating system, such as seating system 816.

Figure 9:
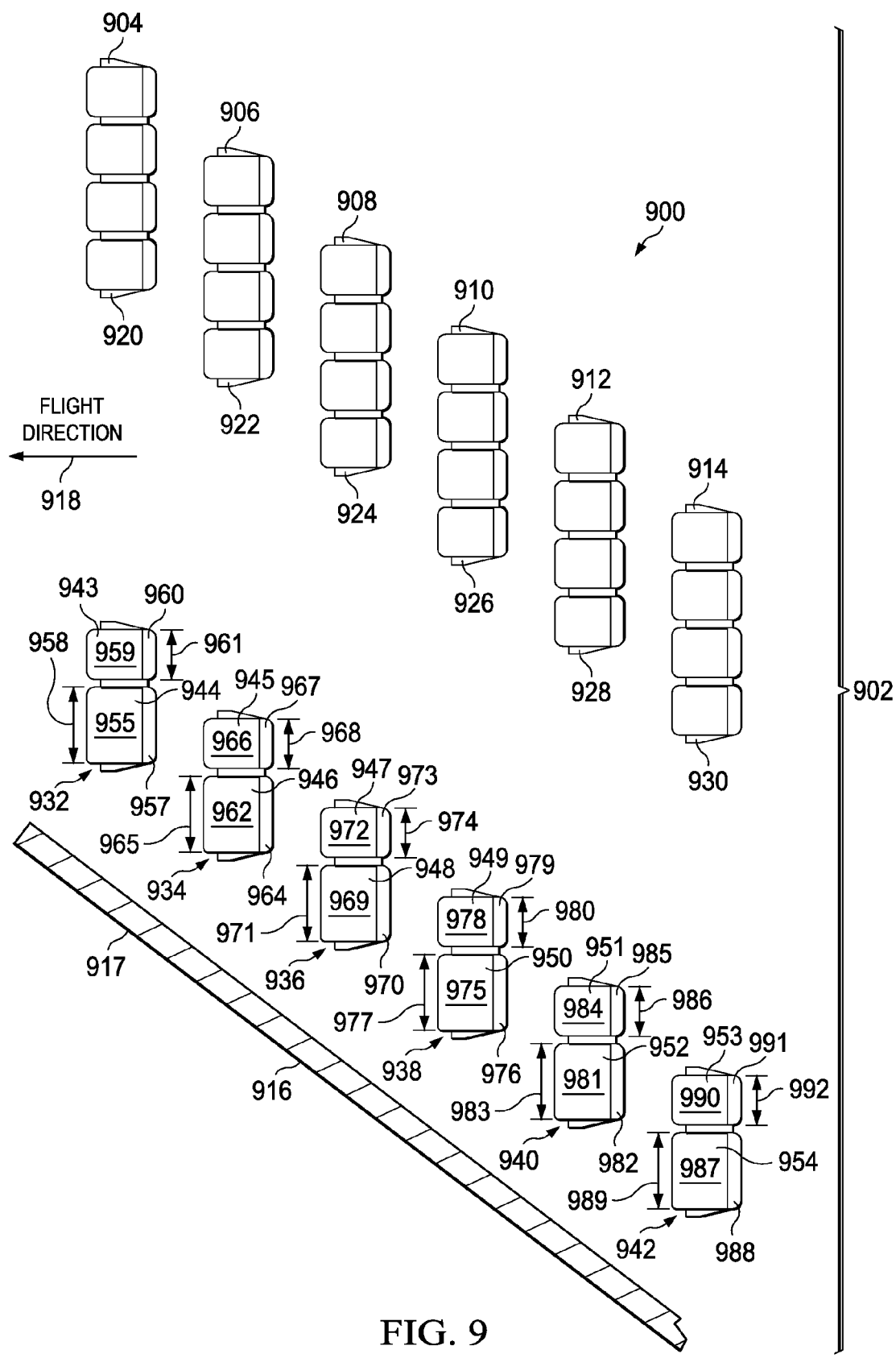
FIG. 9 is an illustration of a passenger area with seating units in accordance with an advantageous embodiment.

With reference now to FIG. 9, an illustration of a passenger area with seating units is depicted in accordance with an advantageous embodiment. In this illustrative example, passenger area 900 may be an example of an implementation for passenger area 220 shown in block form in FIG. 2.

The configuration of passenger area 900 may be for an unconventional aircraft payload configuration.

In this illustrative example, passenger area 900 may include plurality of seating units 902. Plurality of seating units 902 may be configured in rows 904, 906, 908, 910, 912, and 914. In this illustrative example, wall 916 for fuselage 917 may face forward in flight direction 918. In these illustrative examples, plurality of seating units 902 may comprise seating units 920, 922, 924, 926, 928, 930, 932, 934, 936, 938, 940, and 942. Seating units 932, 934, 936, 938, 940, and 942 may be adjacent to wall 916. These seating units may be implemented using seating unit 228 shown in block form in FIG. 2.

In this illustrative example, seating unit 932 may comprise seating system 943 and seating system 944. Seating unit 934 may comprise seating system 945 and seating system 946. Seating unit 936 may comprise seating system 947 and seating system 948. Seating unit 938 may comprise seating system 949 and seating system 950. Seating unit 940 may comprise seating system 951 and seating system 952. Seating unit 942 may comprise seating system 953 and seating system 954.

In these illustrative examples, seating system 944 may have seat cushion 955 and seat back 957. These components may have width 958. Seat cushion 959 and seat back 960 in seating system 943 may have width 961.

In seating unit 934, seating system 946 may have seat cushion 962 and seat back 964. Seat cushion 962 and seat back 964 may have width 965 in this depicted example. Seating system 945 may have seat cushion 966 and seat back 967. These components may have width 968.

Seating system 948 in seating unit 936 may have seat cushion 969 and seat back 970. These components may have width 971. Seat cushion 972 and seat back 973 in seating system 947 may have width 974.

In seating unit 938, seating system 950 may have seat cushion 975 and seat back 976. These components may have width 977. Seat cushion 978 and seat back 979 in seating system 949 may have width 980. Seat cushion 981 and seat back 982 may have width 983 in seating system 952. In seating system 951, seat cushion 984 and seat back 985 may have width 986.

In seating unit 942, seating system 954 may have seat cushion 987 and seat back 988 with width 989. In seating system 953, seat cushion 990 and seat back 991 may have width 992.

In these illustrative examples, widths 958, 965, 971, 977, 983, and 989 may be greater than widths 961, 968, 974, 980, 986, and 992. In these illustrative examples, widths 958, 965, 971, 977, 983, and 989 may be about 25 inches. Widths 961, 968, 974, 980, 986, and 992 may be about 18 inches.

Figure 10:
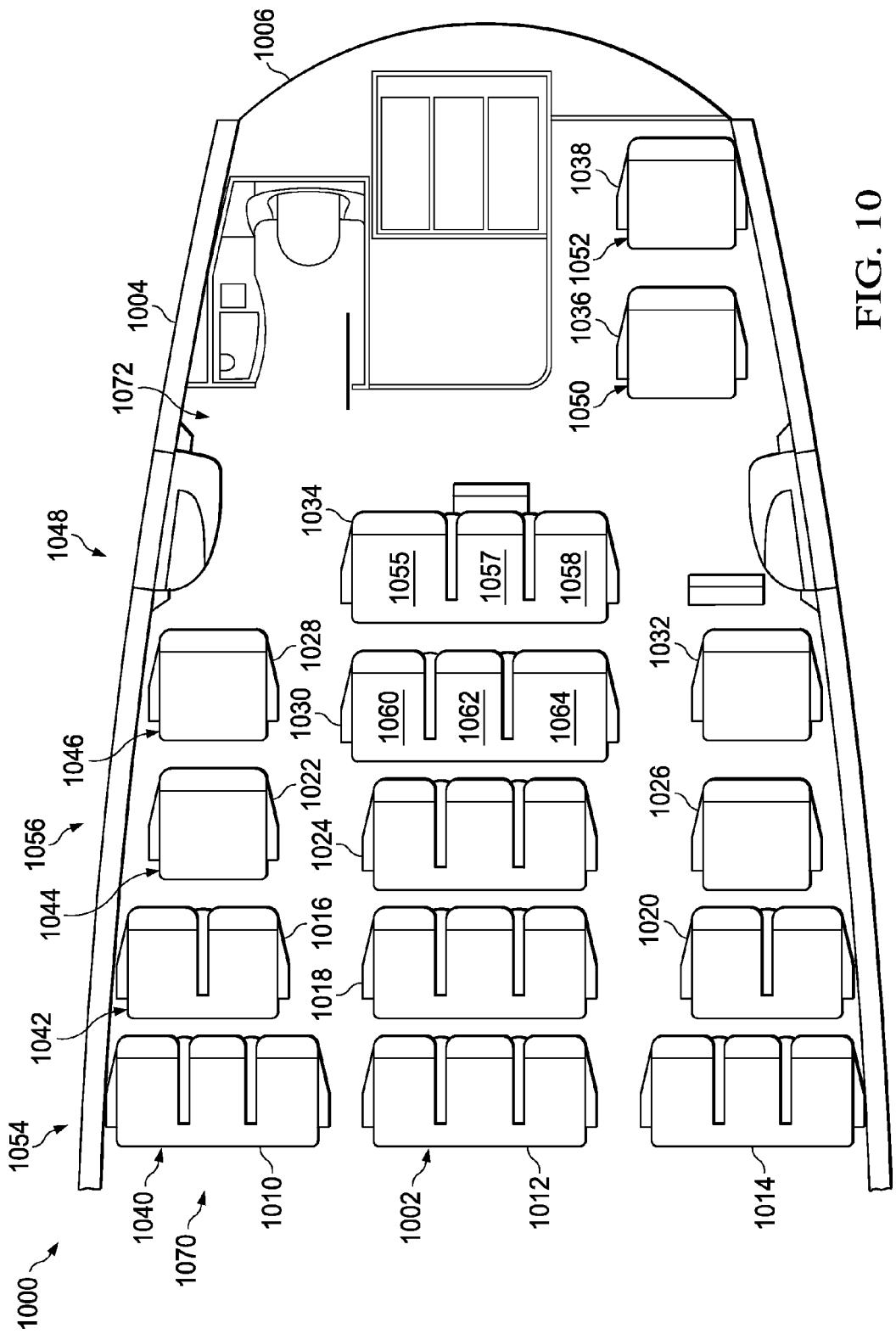
FIG. 10 is an illustration of a passenger area with seating units in a tapered section of a fuselage in accordance with an advantageous embodiment.

Turning next to FIG. 10, an illustration of a passenger area with seating units in a tapered section of a fuselage is depicted in accordance with an advantageous embodiment. In this illustrative example, passenger area 1000 may be an example of an implementation for passenger area 220 shown in block form in FIG. 2.

As depicted, passenger area 1000 may include plurality of seating units 1002. In this illustrative example, plurality of seating units 1002 may be located in aft section 1004 of aircraft 1006.

In this illustrative example, plurality of seating units 1002 may comprise seating units 1010, 1012, 1014, 1016, 1018, 1020, 1022, 1024, 1026, 1028, 1030, 1032, 1034, 1036 and 1038. In this illustrative example, seating units 1010, 1012, and 1014 may be located in row 1040. Seating units 1016, 1018, and 1020 may be located in row 1042. Seating units 1022, 1024, and 1026 may be located in row 1044. Seating units 1028, 1030, and 1032 may be located in row 1046. Seating units 1034 may be located in row 1048. Seating unit 1036 may be located in row 1050, and seating unit 1038 may be located in row 1052.

In these illustrative examples, the seating units in row 1040 may be part of untapered section 1054. The seating units in rows 1042, 1044, 1046, 1048, 1050, and 1052 may be part of tapered section 1056 of aircraft 1006.

As can be seen in this illustrative example, seating units in untapered section 1054 each may have three seating systems as depicted in seating units 1010, 1012, and 1014. Seating units in tapered section 1056 may vary in the number of seating systems present in a seating unit.

For example, in row 1042, seating unit 1016 may have two seating systems, seating unit 1018 may have three seating systems, and seating unit 1020 may have two seating systems. In row 1044, seating unit 1022 may have a single seating system, seating unit 1024 may have three seating systems, and seating unit 1026 may have a single seating system.

In a similar fashion, in row 1046, seating unit 1028 may have a single seating system, seating unit 1030 may have three seating units, and seating system 1032 may have a single seating unit. In row 1048, a single seating unit may be present with three seating systems. In row 1050, a single seating unit may be present as well as in row 1052.

In these illustrative examples, one or more of plurality of seating units 1002 may be implemented using seating unit 228 shown in block form in FIG. 2. For example, seating unit 1030 may include two different types of seating systems. In other words, the seating systems may have two different types of dimensions to accommodate different types of passengers.

As depicted, seating system 1055 in seating unit 1034 may accommodate first type of passenger 270 while seating system 1057 and seating system 1058 in seating unit 1034 may accommodate second type of passenger 272 shown in block form in FIG. 2. In a similar fashion, seating units 1022, 1028, 1026, 1032, 1036, and 1038 may accommodate first type of passenger 270.

As another example, seating system 1060 and seating system 1062 in seating unit 1030 may accommodate second type of passenger 272 while seating system 1064 may accommodate first type of passenger 270.

With tapered section 1056, seating systems with different types of dimensions may be present to accommodate different types of passengers. Seating systems with larger seats may be placed in locations, such as tapered section 1056, which normally would be wasted or unused.

In other words, seating systems may be used in seating units to seat larger sized passengers rather than using standard seating systems. The larger seating systems may use space that cannot be used with standard seating systems. In the illustrative examples, the seating unit may be selected such that unused space in the tapered section of the aircraft is reduced. In particular, the selection of seating systems for the seating unit may be selected to reduce unused space. For example, only two seating systems may be used in a seating unit for a particular location in tapered section 1056 instead of a seating unit with three seating systems. With this situation some space may still be present between a seating system in the seating unit and the fuselage of the aircraft. A larger seating system may be used that uses more of the space present between the seating unit and the fuselage of the aircraft.

If passengers requiring the larger seating systems are not present, these seating systems may be sold to customers for a higher price because they provide additional space and comfort.

In these illustrative examples, first plurality of seating systems 1070 in untapered section 1054 may have a selected number of seating systems arranged in rows. Second plurality of seating systems 1072 in tapered section 1056 may have at least one less seating system in one row as compared to first plurality of seating systems 1070 in which second plurality of seating systems 1072 includes at least one more seating system of first type of seating system 282 shown in block form in FIG. 2 as compared to first plurality of seating systems 1070. Further, all seating systems in first plurality of seating systems 1070 may be second type of seating system 284 in these illustrative examples.

For example, the seating systems in seating units 1010, 1012, and 1014 in row 1040 in untapered section 1054 may have nine seating systems. In comparison, the seating systems in seating units 1028, 1030, and 1032 in row 1046 in tapered section 1056 may have five seating systems. Three of these seating systems may be first type of seating system 282 while two of the seating systems may be second type of seating system 284. Of course, other configurations may be present in other implementations.

Figure 11:
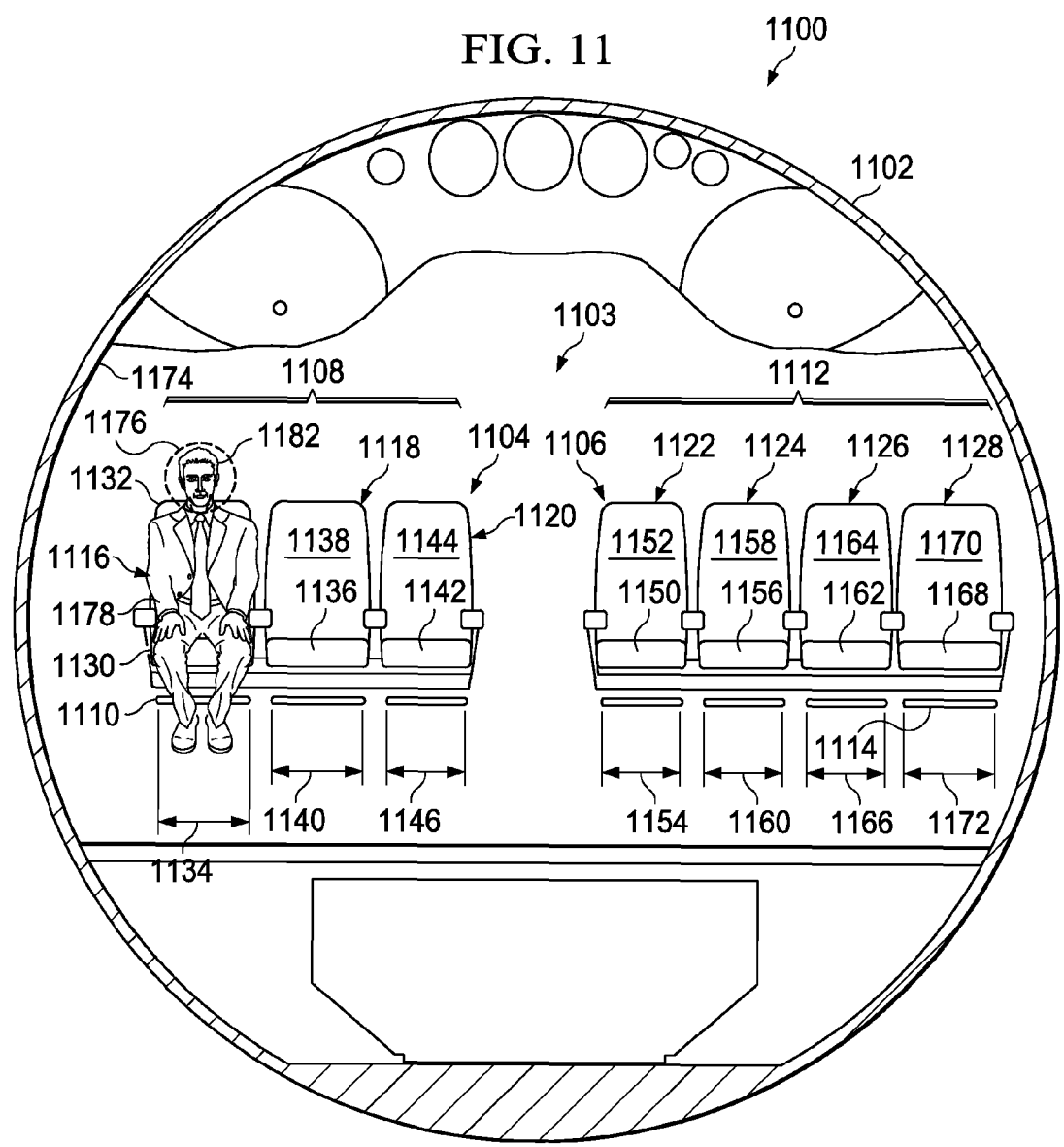
FIG. 11 is an illustration of a fuselage with seating units in accordance with an advantageous embodiment.

With reference now to FIG. 11, an illustration of a fuselage with seating units is depicted in accordance with an advantageous embodiment. In this illustrative example, cross-section 1100 of fuselage 1102 with passenger area 1103 is depicted. In this illustrative example, seating unit 1104 and seating unit 1106 are illustrated within passenger area 1103 in this cross-sectional view.

In this illustrative example, seating unit 1104 comprises seating systems 1108, which are illustrated as attached to frame 1110. Seating systems 1112 are illustrated as being attached to frame 1114. In this illustrative example, seating systems 1108 may comprise seating system 1116, seating system 1118, and seating system 1120. Seating systems 1112 in seating unit 1106 may comprise seating systems 1122, 1124, 1126, and 1128.

In this illustrative example, seating system 1116 may comprise seat cushion 1130 and seat back 1132. These components may have width 1134. Seating system 1118 may have seat cushion 1136 and seat back 1138. Seat cushion 1136 and seat back 1138 may have width 1140. Seating system 1120 may comprise seat cushion 1142 and seat back 1144. Seat cushion 1142 and seat back 1144 may have width 1146.

In seating unit 1106, seating system 1122 may have seat cushion 1150 and seat back 1152 with width 1154. Seat cushion 1156 and seat back 1158 in seating system 1124 may have width 1160. Seating system 1126 may have seat cushion 1162 and seat back 1164. These components may have width 1166. Seat cushion 1168 and seat back 1170 in seating system 1128 may have width 1172. In these illustrative examples, width 1134 for seating system 1116 and width 1140 for seating system 1118 may be about the same width. Width 1134 and width 1140 may be greater than width 1146 for seating system 1120.

As illustrated, width 1154 for seating system 1122, width 1160 for seating system 1124, and width 1166 for seating system 1126 may be about the same width. Width 1172 for seating system 1128 may be greater than width 1154, width 1160, and width 1166 in these illustrative examples.

A greater width for width 1134 and width 1172 may provide additional room for passengers, such as passenger 1178. In these illustrative examples, width 1134 and width 1172 may provide better comfort for passengers in those seating systems. Width 1134 may be especially useful with respect to curvature 1174 in fuselage 1102. Headroom 1176 for head 1182 for passenger 1178 may be sufficient with width 1134 as opposed to width 1146 based on headroom 1176 available for seating system 1116 adjacent to curvature 1174 of fuselage 1102.

In a similar instance, width 1172 may provide for greater comfort for passenger 1178 in addition to headroom 1176 being sufficient with respect to curvature 1174 in fuselage 1102.

Figure 12:
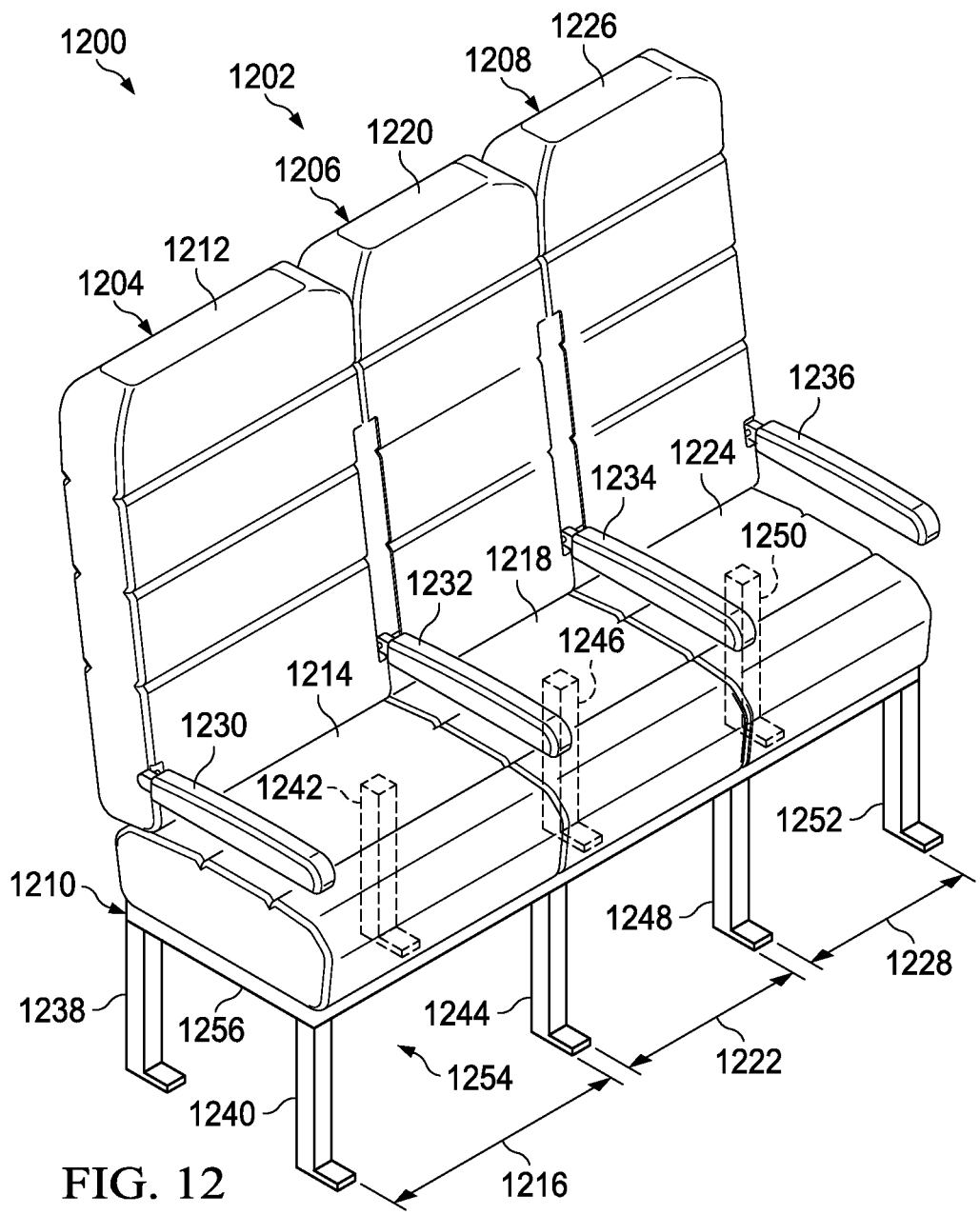
FIG. 12 is an illustration of a seating unit in accordance with an advantageous embodiment.

With reference now to FIG. 12, an illustration of a seating unit is depicted in accordance with an advantageous embodiment. In this illustrative example, seating unit 1200 is an illustration of a physical implementation for seating unit 228 shown in block form in FIG. 2.

In this illustrative example, seating unit 1200 comprises plurality of seating systems 1202. Seating system 1204, seating system 1206, and seating system 1208 may be seating systems within plurality of seating systems 1202.

Frame 1210 in seating unit 1200 may be configured to be connected to plurality of seating systems 1202. In this illustrative example, seating system 1204 may comprise seat back 1212 and seat cushion 1214. These components may have width 1216. Seat cushion 1218 and seat back 1220 may have width 1222. In seating system 1208, seat cushion 1224 and seat back 1226 may have width 1228.

Additionally, seating unit 1200 also may include arm rests 1230, 1232, 1234, and 1236. As depicted, width 1216 may be present between arm rest 1230 and arm rest 1232. Width 1222 may be present between arm rest 1232 and arm rest 1234. Width 1228 may be present between arm rest 1234 and arm rest 1236.

In this illustrative example, arm rest 1230 and arm rest 1232 may be for seating system 1204. Arm rest 1232 and arm rest 1234 may be for seating system 1206. Arm rest 1234 and arm rest 1236 may be for seating system 1208. As can be seen, width 1216 of seating system 1204 may be greater than width 1222 of seating system 1206 and width 1228 of seating system 1208.

As illustrated, frame 1210 for seating unit 1200 may have leg elements 1238, 1240, 1242, 1244, 1246, 1248, 1250, and 1252 that rest on seat floor 1254. Seat floor 1254 may be, for example, without limitation, a floor structure. Additionally, frame 1210 also may include seat structure 1256.

These different components in frame 1210 may be configured to support passengers of different types. For example, these components may be configured to support both passengers of first type of passenger 270 and second type of passenger 272 shown in block form in FIG. 2. When first type of passenger 270 is an oversized passenger, these components may be strengthened to provide additional support for the additional weight. The strengthening may be achieved through a selection of at least one of materials, leg element design, seat structure design, and other suitable parameters. The strengthening may occur such that these components may not fail under specified design load conditions.

Figure 13:
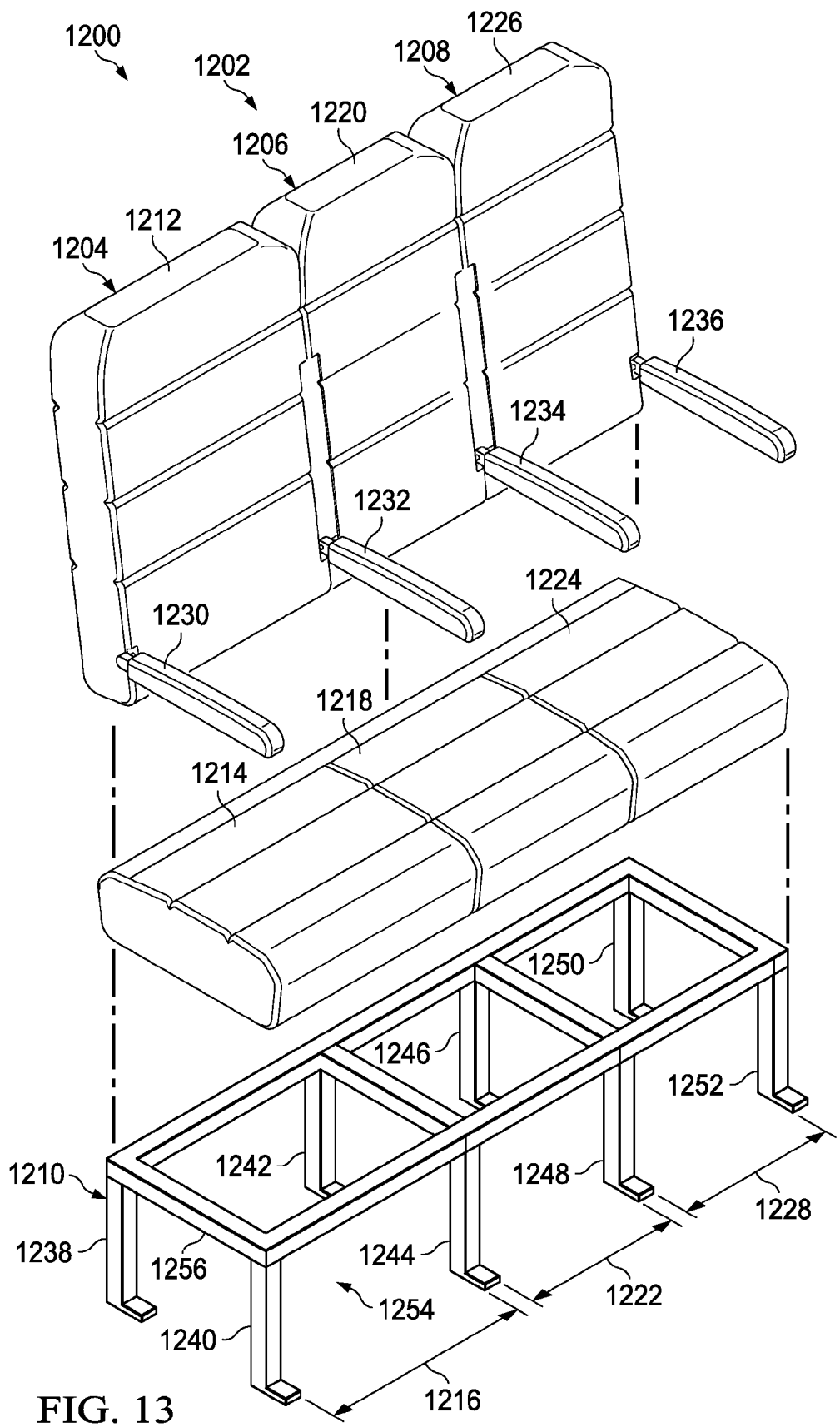
FIG. 13 is an illustration of an exploded view of a seating unit in accordance with an advantageous embodiment.

With reference now to FIG. 13, an exploded view of a seating unit is depicted in accordance with an advantageous embodiment.

Figure 14:
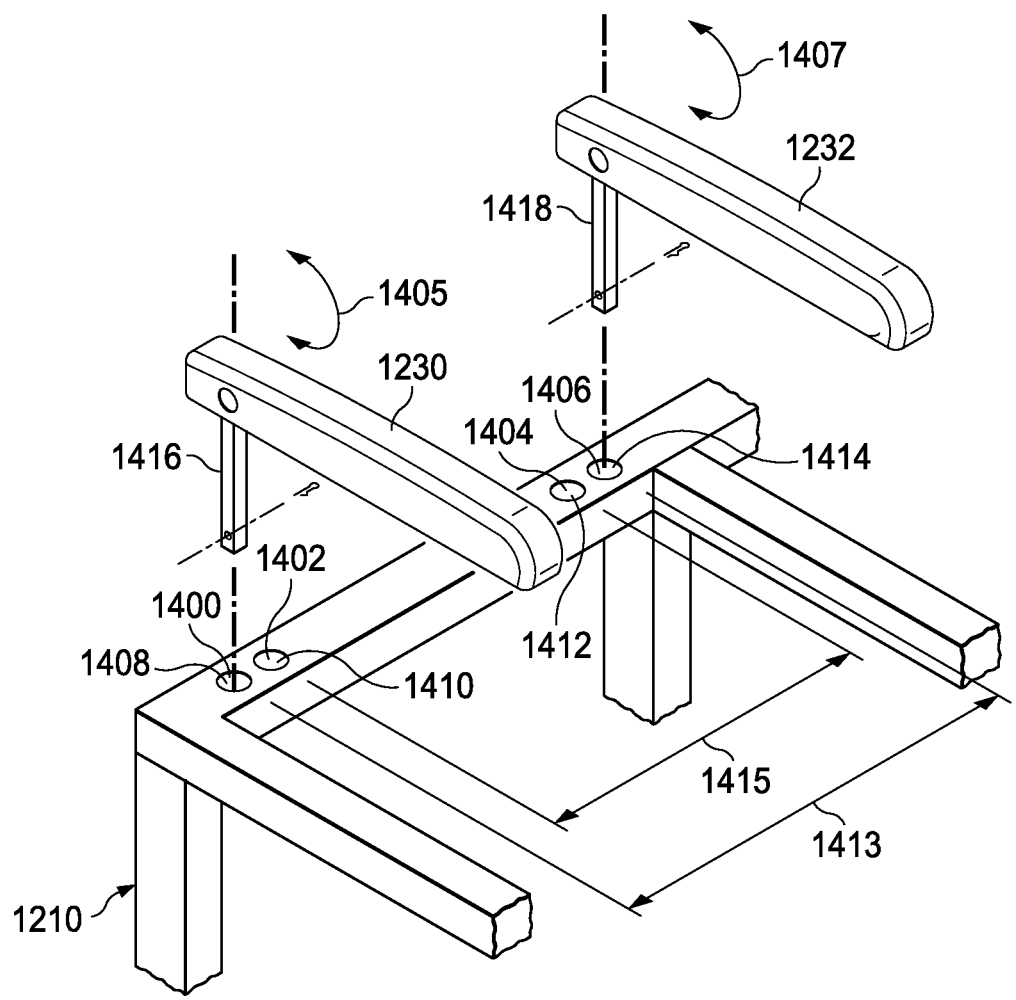
FIG. 14 is an illustration of arm rests in a portion of a frame in accordance with an advantageous embodiment.

With reference now to FIG. 14, an illustration of arm rests in a portion of a frame is depicted in accordance with an advantageous embodiment. In this illustrative example, a portion of frame 1210 is illustrated in more detail. In this illustrative example, frame 1210 may have attachment points 1400, 1402, 1404, and 1406. These attachment points may take the form of openings 1408, 1410, 1412, and 1414.

Peg 1416 for arm rest 1230 may be placed into opening 1408 and peg 1418 for arm rest 1232 may be placed into opening 1414. Arm rest 1230 may pivot in the direction of arrow 1405 and arm rest 1232 may pivot in the direction of arrow 1407 when peg 1416 is placed into opening 1408 and peg 1418 is placed into opening 1414. This placement of arm rest 1230 and arm rest 1232 may result in width 1413 being present between arm rest 1230 and arm rest 1232.

Peg 1416 for arm rest 1230 also may be placed into opening 1410, and peg 1418 for arm rest 1232 may be placed into opening 1412. This placement of arm rest 1230 and arm rest 1232 may result in width 1415 being present between arm rest 1230 and arm rest 1232.

As depicted, width 1415 may be about 18 inches. Width 1413 may be about 22 inches in this illustrative example.

The illustration of arm rest 1230 and arm rest 1232 being placed into different openings is not meant to limit the manner in which widths between arm rests may be adjusted. Other mechanisms may be used to vary the width between arm rests. For example, without limitation, the arm rests may be adjusted or may slide to change between width 1413 and width 1415 without changing attachment points.

Figure 15:
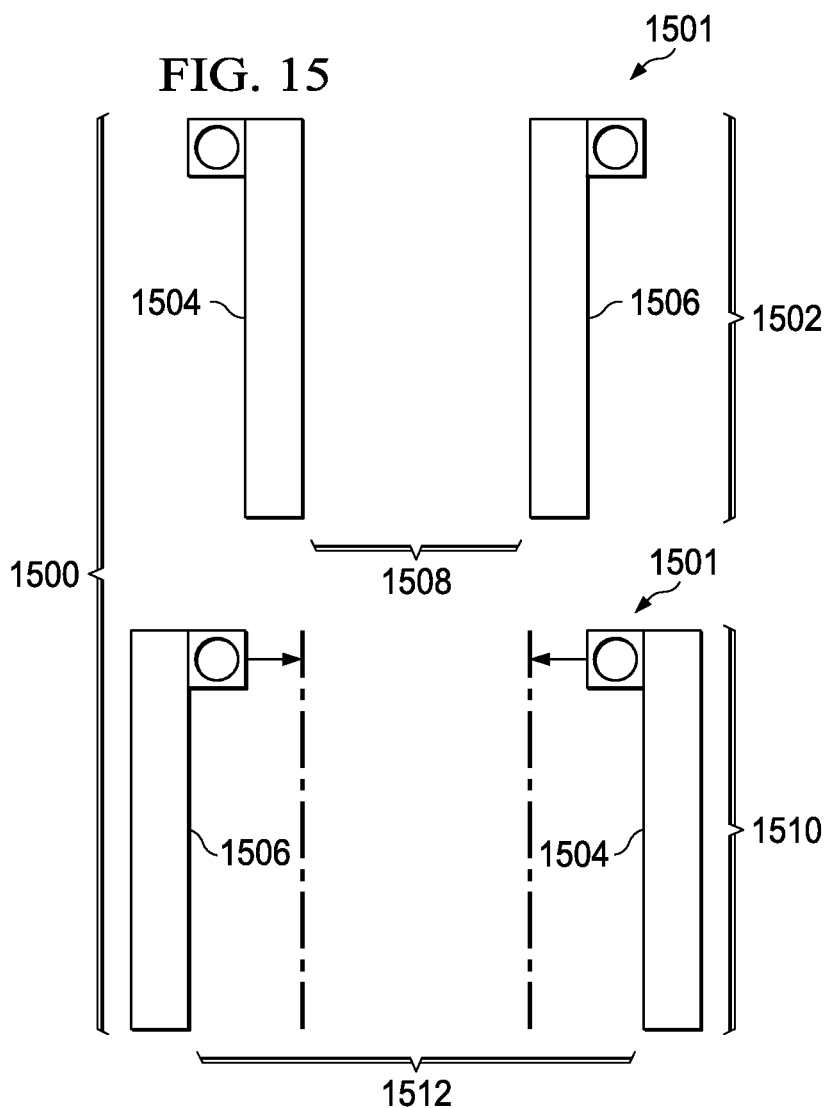
FIG. 15 is an illustration of arm rest configurations in accordance with an advantageous embodiment.

With reference now to FIG. 15, an illustration of arm rest configurations is depicted in accordance with an advantageous embodiment. In this illustrative example, configurations 1500 may be used with frame 1210 in FIG. 12.

Configurations 1500 may be used when only one set of openings may be present for pair of arm rests 1501 in frame 1210. Configurations 1500 allow for widths between the arm rests to be changed. In this manner, configurations 1500 may allow for pair of arm rests 1501 to function as adjustable arm rests. For example, configuration 1502 of arm rest 1504 and arm rest 1506 in pair of arm rests 1501 may result in width 1508. In this manner, arm rest 1504 and arm rest 1506 each may be an adjustable arm rest.

Configuration 1510 of arm rest 1504 and arm rest 1506 may result in width 1512. In this illustrative example, width 1508 may be about 18 inches. Width 1512 may be about 22 inches.

The illustrations of passenger areas, seating units, seating systems, and other components in FIGS. 5-15 may be combined with components in FIG. 2, used with components in FIG. 2, or a combination of the two. Additionally, some of the components shown in these figures may be illustrative examples of how components shown in block form in FIG. 2 may be implemented as physical structures. Further, the different components illustrated in FIGS. 5-15 are illustrations of one manner in which passenger area design 306 in FIG. 3 may be implemented.

Further, these illustrations are not meant to imply limitations to the manner in which different advantageous embodiments may be implemented. For example, without limitation, in some illustrative examples, frame 1210 may include a support for a seat back. In still other illustrative examples, other types of arm rests may be used. These arm rests may be integrated with seat backs or may take other forms depending on the particular implementation.

Also, the number of seating systems illustrated for seating units in FIGS. 5-13 are only examples and not meant to imply limitations to the number of seating systems that may be used. For example, without limitation, some seating units may have five seating systems and others may have six seating systems depending on the particular implementation.

Although the different illustrative examples discuss widths with respect to seat cushions, these widths may also apply to other components in seating systems. For example, the different widths may be applied to widths for seat backs, widths between arm rests, and other suitable components. As yet another illustrative example, other dimensions that may vary in seating systems may include a depth of a seat, a thickness of a seat cushion, a height of a seat back, and other suitable dimensions. These and other dimensions may be selected based on a desired level of comfort and an ability to provide seating for passengers of different sizes.

Further, other particular values for seat widths have been described in these figures. These examples are not meant to limit different advantageous embodiments to the illustrative widths described above. For example, the first seating system may be described as being about 18 inches. In other illustrative examples, the first seating system may have a width of about 16 inches, 17 inches, 17.5 inches, 18.5 inches, 19.75 inches, or any other suitable widths. As another example, the second seating system has been described as being from about 20 inches to about 26 inches.

Other ranges may be used. For example, the second width of the second seating system may be about 19 inches, 20 inches, 21 inches, 22 inches, 25 inches, or any other number of widths that are different from the width of the first seating system. In yet another illustrative example, a seating system may have a width of less than 18 inches. This smaller width may be selected to accommodate children. For example, a family of four with two children may fit, when smaller seating systems are selected, into a seating unit that normally seats three people.

Figure 16:
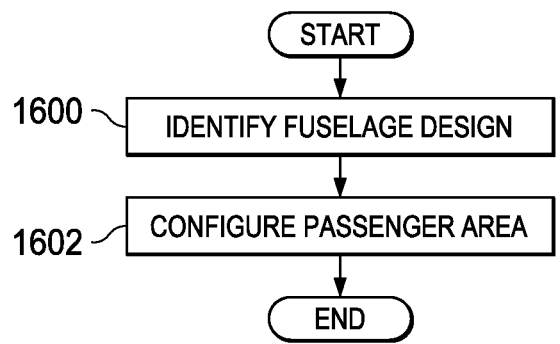
FIG. 16 is an illustration of a flowchart of a process for configuring an aircraft in accordance with an advantageous embodiment.

With reference now to FIG. 16, an illustration of a flowchart of a process for configuring an aircraft is depicted in accordance with an advantageous embodiment. In particular, the process in FIG. 16 may be used to identify configuration 312 for passenger area design 306 shown in block form in FIG. 3. This configuration may be performed in between flights of an aircraft and/or during service and/or maintenance of an aircraft.

The process begins by identifying fuselage design 308 (operation 1600). Fuselage design 308 may be an existing aircraft design or a new aircraft design. The process then configures passenger area 220 (operation 1602), with the process terminating thereafter.

In operation 1602, the configuration of passenger area 220 may include generating passenger area design 306 using design module 302. Thereafter, passenger area design 306 may be used to implement configuration 312 in aircraft 200.

In another illustrative example, arm rests may not be included in a seating unit. In yet another example, some seating systems may include arm rests, while other seating systems in the same seating unit may not include arm rests.

The process illustrated in FIG. 16 may be used to design passenger area 220 for aircraft 200. This design may be part of designing aircraft 200, reconfiguring aircraft 200, or other suitable operations with respect to passenger area 220 for aircraft 200.

Figure 17:
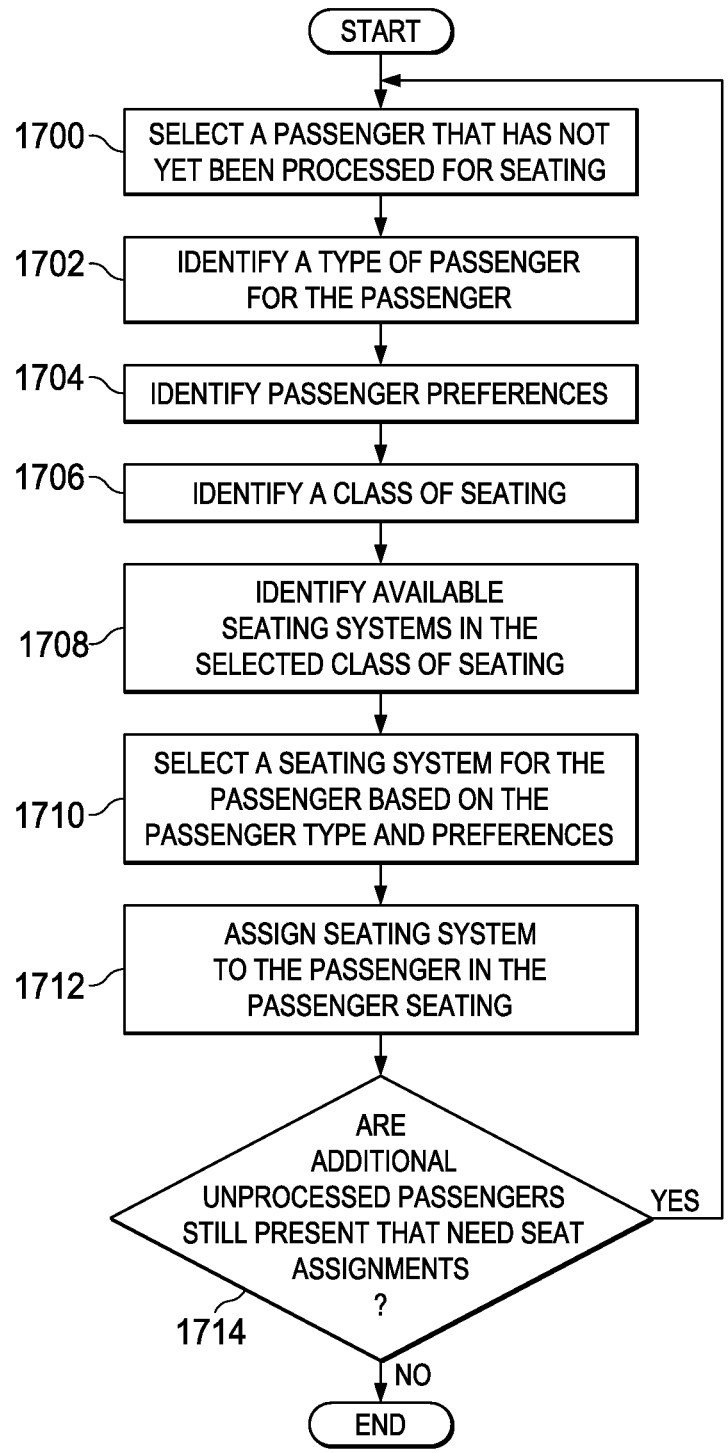
FIG. 17 is an illustration of a flowchart of a process for assigning seating systems in accordance with an advantageous embodiment.

With reference now to FIG. 17, an illustration of a flowchart of a process for assigning seating systems is depicted in accordance with an advantageous embodiment. The process illustrated in FIG. 17 may be implemented in aircraft seating selection system 400 shown in block form in FIG. 4. In particular, the different operations in this flowchart may be implemented in seat assignment module 406 shown in block form in FIG. 4.

The process may begin by selecting a passenger that has not yet been processed for seating (operation 1700). The process may identify type of passenger 269 for the passenger (operation 1702). For example, a passenger type may be first type of passenger 270, second type of passenger 272, or some other suitable type of passenger. In these illustrative examples, first type of passenger 270 may be a passenger greater than about a 98$^{th}$ percentile in hip width while second type of passenger 272 may be equal to or less than about a 98$^{th}$ percentile in hip width.

The process then may identify passenger preferences 424 (operation 1704). The process then may identify a class of seating (operation 1706). In these illustrative examples, the class of seating may be, for example, without limitation, first class, business class, standard class, economy class, or some other suitable type of class of seating. The class of seating may be identified using passenger preferences 424.

The process then may identify available seating systems in the selected class of seating (operation 1708). The process then may select a seating system for the passenger based on the passenger type and passenger preferences 424 (operation 1710). The process then may assign a seating system to the passenger in passenger seating 422 (operation 1712).

Next, the process may determine whether additional unprocessed passengers are still present that need seat assignments (operation 1714). If additional unprocessed passengers are present, the process may return to operation 1700. Otherwise, the process terminates.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The process illustrated may be implemented in aircraft 200 shown in block form in FIG. 2. In these illustrative examples, the process can be implemented in software, hardware, or a combination of the two. When software is used, the operations performed by the processes may be implemented in the program code configured to be run on a processor unit. When hardware is employed, the hardware may include circuits that operate to perform the operations in the processes illustrated.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. Additionally, the processes may be implemented in organic components integrated with inorganic components and/or may be comprised entirely of organic components excluding a human being.

Thus, in this manner, the different advantageous embodiments provide a method and apparatus for configuring passenger areas for an aircraft. With the different advantageous embodiments, seating systems of different sizes may be included to accommodate oversized passengers without requiring oversized passengers to use more than one seating system. Further, when a larger seating system is used, a greater fee may be charged for those seating systems. In this manner, an aircraft operator may increase or optimize revenues and increase passenger satisfaction.

Figure 18:
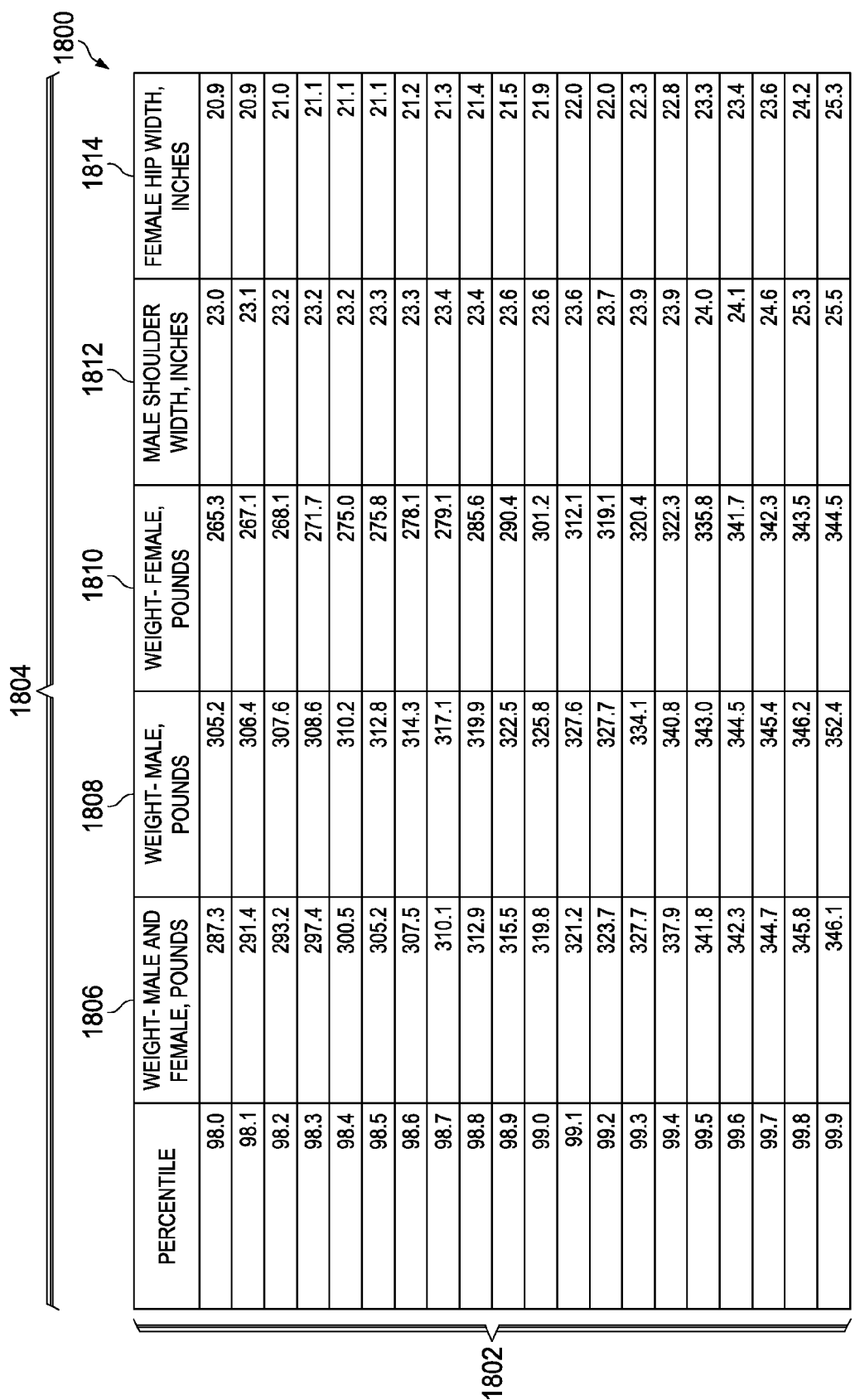
FIG. 18 is an illustration of characteristics for passengers used to identify seating units in accordance with an advantageous embodiment.

Turning next to FIG. 18, an illustration of characteristics for passengers used to identify seating units is depicted in accordance with an advantageous embodiment. In this depicted example, table 1800 illustrates information that may be used by design module 302 in FIG. 3 to design seating units 326. The information in table 1800 also may be used to assign seating systems. For example, seat assignment module 406 in FIG. 4 may use this information in table 1800 to classify passengers in assigning seating systems 408 to generate passenger seating 422.

As depicted, table 1800 may have rows 1802 and columns 1804. Rows 1802 may identify percentiles for different characteristics of people. Columns 1804 may identify characteristics of people.

Rows 1802 may identify percentiles from about 98.0 percent to about 99.9 percent. Column 1806 may identify male and female weight averages for the different percentiles. Column 1808 may specify weight for male passengers in pounds. Column 1810 may include weight for female passengers in pounds. Shoulder width for male passengers may be identified in column 1812 in inches. In column 1814, hip width for female passengers may be identified in inches.

The illustration of table 1800 is not meant to imply limitations to the different characteristics that may be taken into account for passengers in designing and/or assigning seating systems. For example, other characteristics that may be taken into account may include, for example, hip width for male passengers, height, and other suitable characteristics.

Turning now to FIG. 19, an illustration of a data processing system is depicted in accordance with an advantageous embodiment. Data processing system 1900 is an example of a data processing system that may be used to implement a computer in computer system 304 shown in block form in FIG. 3. In this illustrative example, data processing system 1900 includes communications framework 1902, which provides communications between processor unit 1904, memory 1906, persistent storage 1908, communications unit 1910, input/output (I/O) unit 1912, and display 1914.

Processor unit 1904 serves to execute instructions for software that may be loaded into memory 1906. Processor unit 1904 may be a number of processors, a multi-processor core, or some other type of processor, depending on the particular implementation. A number, as used herein with reference to an item, means one or more items. Further, processor unit 1904 may be implemented using a number of heterogeneous processor systems in which a main processor is present with secondary processors on a single chip. As another illustrative example, processor unit 1904 may be a symmetric multi-processor system containing multiple processors of the same type.

Memory 1906 and persistent storage 1908 are examples of storage devices 1916. A storage device may be any piece of hardware that is capable of storing information, such as, for example, without limitation, data, program code in functional form, or other suitable information either on a temporary basis or a permanent basis. Storage devices 1916 may also be referred to as computer readable storage devices in these examples. Memory 1906, in these examples, may be, for example, a random access memory or any other suitable volatile or non-volatile storage device. Persistent storage 1908 may take various forms, depending on the particular implementation.

For example, persistent storage 1908 may contain one or more components or devices. For example, persistent storage 1908 may be a hard drive, a flash memory, a rewritable optical disk, a rewritable magnetic tape, or some combination of the above. The media used by persistent storage 1908 also may be removable. For example, a removable hard drive may be used for persistent storage 1908.

Communications unit 1910, in these examples, provides for communications with other data processing systems or devices. In these examples, communications unit 1910 may be a network interface card. Communications unit 1910 may provide communications through the use of either or both physical and wireless communications links.

Input/output unit 1912 allows for input and output of data with other devices that may be connected to data processing system 1900. For example, input/output unit 1912 may provide a connection for user input through a keyboard, a mouse, and/or some other suitable input device. Further, input/output unit 1912 may send output to a printer. Display 1914 provides a mechanism to display information to a user.

Instructions for the operating system, applications, and/or programs may be located in storage devices 1916, which are in communication with processor unit 1904 through communications framework 1902. In these illustrative examples, the instructions may be in a functional form on persistent storage 1908. These instructions may be loaded into memory 1906 for execution by processor unit 1904. The processes of the different embodiments may be performed by processor unit 1904 using computer implemented instructions, which may be located in a memory, such as memory 1906.

These instructions may be referred to as program code, computer usable program code, or computer readable program code that may be read and executed by a processor in processor unit 1904. The program code in the different embodiments may be embodied on different physical or computer readable storage media, such as memory 1906 or persistent storage 1908.

Program code 1918 may be located in a functional form on computer readable media 1920 that is selectively removable and may be loaded onto or transferred to data processing system 1900 for execution by processor unit 1904. Program code 1918 and computer readable media 1920 form computer program product 1922 in these examples. In one example, computer readable media 1920 may be computer readable storage media 1924 or computer readable signal media 1926. Computer readable storage media 1924 may include, for example, an optical or magnetic disk that may be inserted or placed into a drive or other device that is part of persistent storage 1908 for transfer onto a storage device, such as a hard drive, that is part of persistent storage 1908. Computer readable storage media 1924 also may take the form of a persistent storage, such as a hard drive, a thumb drive, or a flash memory, that is connected to data processing system 1900. In some instances, computer readable storage media 1924 may not be removable from data processing system 1900. In these examples, computer readable storage media 1924 may be a physical or tangible storage device used to store program code 1918 rather than a medium that propagates or transmits program code 1918. Computer readable storage media 1924 may also be referred to as a computer readable tangible storage device or a computer readable physical storage device. In other words, computer readable storage media 1924 may be a media that can be touched by a person.

Alternatively, program code 1918 may be transferred to data processing system 1900 using computer readable signal media 1926. Computer readable signal media 1926 may be, for example, a propagated data signal containing program code 1918. For example, computer readable signal media 1926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1918 may be downloaded over a network to persistent storage 1908 from another device or data processing system through computer readable signal media 1926 for use within data processing system 1900. For instance, program code stored in a computer readable storage medium in a server data processing system may be downloaded over a network from the server to data processing system 1900. The data processing system providing program code 1918 may be a server computer, a client computer, or some other device capable of storing and transmitting program code 1918.

The different components illustrated for data processing system 1900 are not meant to provide architectural limitations to the manner in which different embodiments may be implemented. The different advantageous embodiments may be implemented in a data processing system including components in addition to or in place of those illustrated for data processing system 1900. Other components shown in FIG. 19 can be varied from the illustrative examples shown. The different embodiments may be implemented using any hardware device or system capable of running program code 1918.

In another illustrative example, processor unit 1904 may take the form of a hardware unit that has circuits that are manufactured or configured for a particular use. This type of hardware may perform operations without needing program code 1918 to be loaded into a memory from a storage device to be configured to perform the operations.

For example, when processor unit 1904 takes the form of a hardware unit, processor unit 1904 may be a circuit system, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1918 may be omitted because the processes for the different embodiments are implemented in a hardware unit.

In still another illustrative example, processor unit 1904 may be implemented using a combination of processors found in computers and hardware units. Processor unit 1904 may have a number of hardware units and a number of processors that may be configured to run program code 1918. With this depicted example, some of the processes may be implemented in the number of hardware units, while other processes may be implemented in the number of processors.

Figure 20:
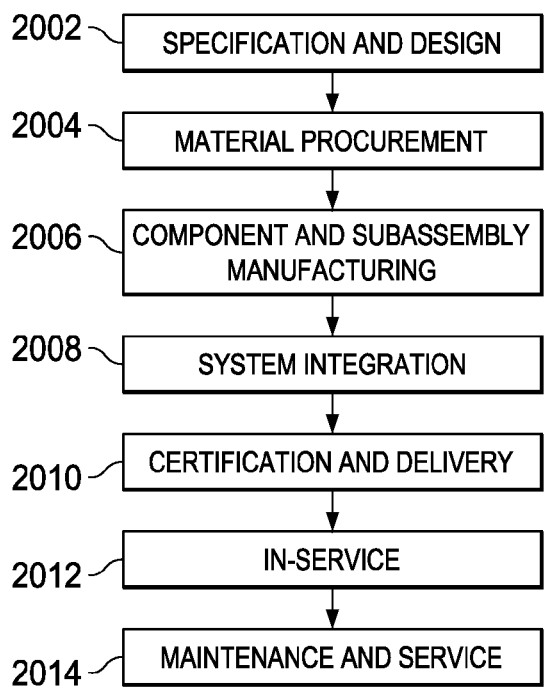
FIG. 20 is an illustration of an aircraft manufacturing and service method in accordance with an advantageous embodiment.
Figure 21:
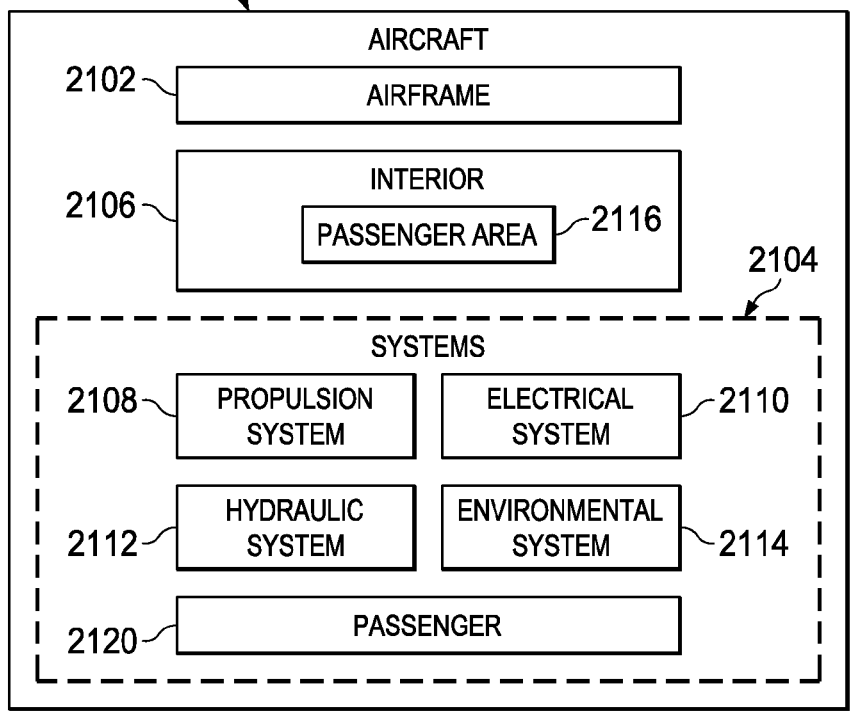
FIG. 21 is an illustration of an aircraft in which an advantageous embodiment may be implemented.

Advantageous embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an advantageous embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 may go through certification and delivery 2010 in order to be placed in-service 2012. While in-service 2012 by a customer, aircraft 2100 in FIG. 21 may be scheduled for routine maintenance and service 2014, which may include modification, reconfiguration, refurbishment, and other maintenance or service.

Each of the processes of aircraft manufacturing and service method 2000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an advantageous embodiment may be implemented. In this example, aircraft 2100 may be produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included.

Apparatuses and methods embodied herein may be employed during at least one of the stages of aircraft manufacturing and service method 2000 in FIG. 20.

In one illustrative example, components or subassemblies produced in component and subassembly manufacturing 2006 in FIG. 20 may be fabricated or manufactured in a manner similar to components or subassemblies produced while aircraft 2100 is in-service 2012 in FIG. 20. As yet another example, one or more apparatus embodiments, method embodiments, or a combination thereof may be utilized during production stages, such as component and subassembly manufacturing 2006 and system integration 2008 in FIG. 20. One or more apparatus embodiments, method embodiments, or a combination thereof may be utilized while aircraft 2100 is in-service 2012 and/or during maintenance and service 2014 in FIG. 20.

For example, one or more advantageous embodiments may be implemented during at least one of specification and design 2002, system integration 2008, and maintenance and service 2014 to configure a passenger area 2116 in interior 2106 of aircraft 2100. In particular, passenger area 2116 may be implemented using a seating unit, such as seating unit 228 in FIG. 2.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as may be suited to the particular use contemplated.

What is claimed is:

1. A method for assigning seating systems in an aircraft to passengers, the method comprising:

identifying, using a computer system and at least one physical dimension of a passenger in the passengers, a type of passenger;

receiving in the computer system, a passenger preference for a seating system in the seating systems, the passenger preference comprising at least one of: a particular aisle preferred by the passenger, a particular row preferred by the passenger, a class seating preferred by the passenger, a seat type preferred by the passenger, a preference of the passenger for an aisle seating system, and a preference of the passenger for a window seating system;

a row in the aircraft comprising a frame comprising types of seating systems convertible between a first type of seating system and a second type of seating system; and the computer system selecting, using the type of passenger and the passenger preference, an assigned seating system for the passenger, the assigned seating system comprising at least one of: the first type of seating system configured to seat a first type of passenger, and the second type of seating system configured to seat a second type of passenger.

2. The method of claim 1 further comprising:

identifying, using the computer system and the passenger preference, a class of seating: and selecting the seating system from available seating systems in the class of seating identified based on the type of passenger and the passenger preference.

3. The method of claim 1, further comprising:

identifying the type of passenger for the passenger based on at least one physical dimension of width, a shoulder width, a hip width, and a height of the passenger.

4. The method of claim 1 further comprising:

the computer system assigning the seating system selected for the passenger to the passenger.

5. The method of claim 1, further comprising:

selecting the seating system from one of: a first seating system comprising first dimensions, and a second seating system comprising second dimensions, the first seating system comprising first dimensions configured for seating a first type of passenger, and the second seating system comprising second dimensions configured for seating a second type of passenger, such that the first type of passenger is unable to fit in the second seating system.

6. The method of claim 3, further comprising a first type of passenger comprising a hip width unable to fit in a second type of seating system.

7. A method for assigning seating systems in an aircraft to passengers, the method comprising:

receiving in a computer system, a passenger preference for a seating system in the seating systems;

identifying, using the computer system and at least one of: a shoulder width, a hip width, and a height of the passenger, a type of passenger;

identifying, using the passenger preference, a class of seating;

a row in the aircraft comprising a frame comprising seating systems convertible between a first seating system and a second seating system;

selecting, using the computer system and the type of passenger and the passenger preference, an assigned seating system from available seating systems in the class of seating, the seating system comprising at least one of: the first seating system comprising first dimensions, and the second seating system comprising second dimensions, the first seating system comprising the first dimensions configured for seating a first type of passenger, and the second seating system comprising the second dimensions configured for seating a second type of passenger, the first type of passenger comprising a hip width unable to fit in the second seating system; and the computer system assigning the assigned seating system to the passenger.

8. The method of claim 5, further comprising the second dimensions differing from the first dimensions.

9. The method of claim 1, wherein selecting the seating system for the passenger further comprises:

selecting the first type of seating system for the first type of passenger from a first plurality of seating systems located in a tapered section of a fuselage of the aircraft.

10. The method of claim 9, wherein selecting the seating system for the passenger further comprises:

selecting the second type of seating system for the second type of passenger from a second plurality of seating systems located in an untapered section of a fuselage of the aircraft.

11. The method of claim 10, further comprising:

selecting the first type of seating system for the first type of passenger from a first selected row in the tapered section, the first selected row comprising a first number of the first type of seating systems.

12. The method of claim 11, wherein selecting the second type of seating system for the second type of passenger further comprises:

selecting the second type of seating system for the second type of passenger from a second row located in the untapered section, wherein the second row has at least one more seating system as compared to a first row in the tapered section.

13. The method of claim 12, wherein the first row comprising at least one more of the first type of seating system as compared to the second row.

* * * * *

UNITED STATES PATENT AND TRADEMARK OFFICE
CERTIFICATE OF CORRECTION

PATENT NO. : 9,783,300 B2  
APPLICATION NO. : 14/446207  
DATED : October 10, 2017  
INVENTOR(S) : Boren et al.

Page 1 of 1

It is certified that error appears in the above-identified patent and that said Letters Patent is hereby corrected as shown below:

Column 25, Line 52, correct "a first type" to read -- the first type --  
Column 25, Line 53, correct "a second type" to read -- the second type --

Signed and Sealed this  
Tenth Day of July, 2018

Andrei Iancu  
*Director of the United States Patent and Trademark Office*